United States Patent
Koyama

(10) Patent No.: US 11,514,135 B2
(45) Date of Patent: Nov. 29, 2022

(54) OPTIMIZATION APPARATUS, TEMPERATURE SETTING METHOD, AND NON-TRANSITORY COMPUTER-READABLE STORAGE MEDIUM

(71) Applicant: FUJITSU LIMITED, Kawasaki (JP)

(72) Inventor: Jumpei Koyama, Setagaya (JP)

(73) Assignee: FUJITSU LIMITED, Kawasaki (JP)

(*) Notice: Subject to any disclaimer, the term of this patent is extended or adjusted under 35 U.S.C. 154(b) by 230 days.

(21) Appl. No.: 17/118,672

(22) Filed: Dec. 11, 2020

(65) Prior Publication Data
US 2021/0216608 A1    Jul. 15, 2021

(30) Foreign Application Priority Data
Jan. 15, 2020  (JP) .............................. JP2020-004516

(51) Int. Cl.
*G06F 17/11* (2006.01)
*G06F 30/20* (2020.01)
*G06F 111/10* (2020.01)

(52) U.S. Cl.
CPC .............. *G06F 17/11* (2013.01); *G06F 30/20* (2020.01); *G06F 2111/10* (2020.01)

(58) Field of Classification Search
CPC ....... G06F 17/11; G06F 30/20; G06F 2111/10
See application file for complete search history.

(56) References Cited

U.S. PATENT DOCUMENTS

| | | | |
|---|---|---|---|
| 2017/0220924 A1* | 8/2017 | Danjo | G06N 3/063 |
| 2018/0005114 A1* | 1/2018 | Tomita | G06N 3/063 |
| 2018/0107172 A1* | 4/2018 | Takatsu | G05D 23/1917 |
| 2019/0286077 A1 | 9/2019 | Koyama et al. | |

FOREIGN PATENT DOCUMENTS

| | | |
|---|---|---|
| JP | 2018-005541 A | 1/2018 |
| JP | 2019-159782 A | 9/2019 |
| JP | 2019-194765 A | 11/2019 |

OTHER PUBLICATIONS

Okuyama T, Hayashi M, Yamaoka M. An Ising computer based on simulated quantum annealing by path integral Monte Carlo method. In2017 IEEE international conference on rebooting computing (ICRC) Nov. 8, 2017 (pp. 1-6). IEEE. (Year: 2017).*

(Continued)

*Primary Examiner* — Chuen-Meei Gan
(74) *Attorney, Agent, or Firm* — Fujitsu Patent Center

(57) ABSTRACT

An optimization apparatus includes a processor. The processor configured to execute search for a ground state of energy in an Ising model by using a plurality of temperature values, select a first solution and a second solution from a plurality of solutions, sequentially perform processing of calculating a change of the energy in the Ising model caused when one value of a plurality of bits of a bit sequence of the first solution different from bits of a bit sequence of the second solution is changed on each of the plurality of bits, computing, when an increase of the energy continuously occurs a plurality of number of times, a total value of the energies increased in the plurality of number of times, decide a maximum value of the plurality of temperature values based on the total value, and setting the decided maximum value.

12 Claims, 17 Drawing Sheets

(56) References Cited

OTHER PUBLICATIONS

Ortega-Zamorano F, Montemurro MA, Cannas SA, Jerez JM, Franco L. FPGA hardware acceleration of monte carlo simulations for the ising model. IEEE Transactions on Parallel and Distributed Systems. Dec. 4, 2015;27(9):2618-27. (Year: 2015).*

Miki, Mitsunori et al., "Adaptive Simulated Annealing for Maximum Temperature", Systems, Man and Cybernetics, 2003. IEEE International Conference ON;[IEEE International Conference on Systems, Man, and Cybernetics], IEEE, Piscataway, NJ, USA, vol. 1, Oct. 5, 2003, pp. 20-25, XP010666642.

Extended European Search Report dated May 27, 2021 for corresponding European Patent Application No. 20213267.6, 6 pages.

*Please note US-2018/0005114-A1 cited herewith, was previously cited in an IDS filed on Dec. 11, 2020.*.

* cited by examiner

OPTIMIZATION APPARATUS, TEMPERATURE SETTING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-4516, filed on Jan. 15, 2020, the entire contents of which are incorporated herein by reference.

FIELD

The embodiments discussed herein are related to an optimization apparatus, a temperature setting method for the optimization apparatus, and a non-transitory computer-readable storage medium.

BACKGROUND

As a method of solving a multivariate optimization problem which is not easily handled by a Neumann-type computer, there is an optimization apparatus (which is also referred to as an Ising machine or a Boltzmann machine) using an Ising-type energy function (which is also referred to as a cost function or an objective function).

In calculation by the optimization apparatus, a problem to be calculated is replaced by an Ising model which is a model representing a behavior of a spin of a magnetic body. Based on Markov Chain Monte Carlo method such as a simulated annealing method or a replica-exchange method (which is also referred to as an exchange Monte Carlo method), a ground state of energy in an Ising model (a state that the value of the energy function is minimum) is searched. A combination of values of bits (hereinafter, each of which may also be referred to as a state variable) corresponding to states of spins in the ground state is an optimum solution to be acquired.

In a simulated annealing method or a replica-exchange method, a temperature is used as a parameter for generating a noise value for causing the current state to escape from a local solution. In a simulated annealing method, during search for a ground state, the temperature is gradually reduced from a highest temperature to a lowest temperature. In a replica-exchange method, temperatures different from each other are set for a plurality of replicas, and exchange of states (or temperatures) is performed between the replicas at a predetermined exchange probability during search for a ground state.

An optimization apparatus that calculates a combination of values of bits, which causes energy (the value of the energy function) to be minimum in an Ising model, by performing a simulated annealing method or a replica-exchange method with a digital circuit is proposed (see Japanese Laid-open Patent Publication Nos. 2018-5541 and 2019-194765, for example). The proposed optimization apparatus calculates an energy change by changing one bit at a time and decides whether or not to accept the change of the bit in accordance with a comparison between a noise value corresponding to the temperature and the calculated energy change.

A technique is also proposed (see Japanese Laid-open Patent Publication No. 2019-159782, for example) which uses a simulated annealing method for solving an optimization problem with a continuous variable by using tunnel effect.

SUMMARY

According to an aspect of the embodiments, an optimization apparatus includes a memory, a processor coupled to the memory and configured to execute search for a ground state of energy in an Ising model by using a plurality of temperature values, select a first solution and a second solution from a plurality of solutions, sequentially perform processing of calculating a change of the energy in the Ising model caused when one value of a plurality of bits of a bit sequence of the first solution different from bits of a bit sequence of the second solution is changed on each of the plurality of bits, computing, when an increase of the energy continuously occurs a plurality of number of times, a total value of the energies increased in the plurality of number of times, decide a maximum value of the plurality of temperature values based on the total value, and setting the decided maximum value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In an optimization apparatus which searches a ground state by using temperatures as the related art, the proper highest temperature differs between problems to be calculated. When the highest temperature is excessively high, a state transition (a change of the value of the bit) excessively frequently occurs. On the other hand, when the highest temperature is excessively low, the state may not be escaped from a local solution, and, in all cases, it is difficult for the state to converge to an optimum solution. Accordingly, it is desired to set a highest temperature adapted to a problem to be solved.

In one aspect, it is an object of the present invention to provide an optimization apparatus, a temperature setting method for the optimization apparatus, and a temperature setting program for the optimization apparatus, which enable to set a highest temperature adapted to a problem to be calculated.

Embodiments of the present invention are described below with reference to the drawings.

First Embodiment

Figure 1:
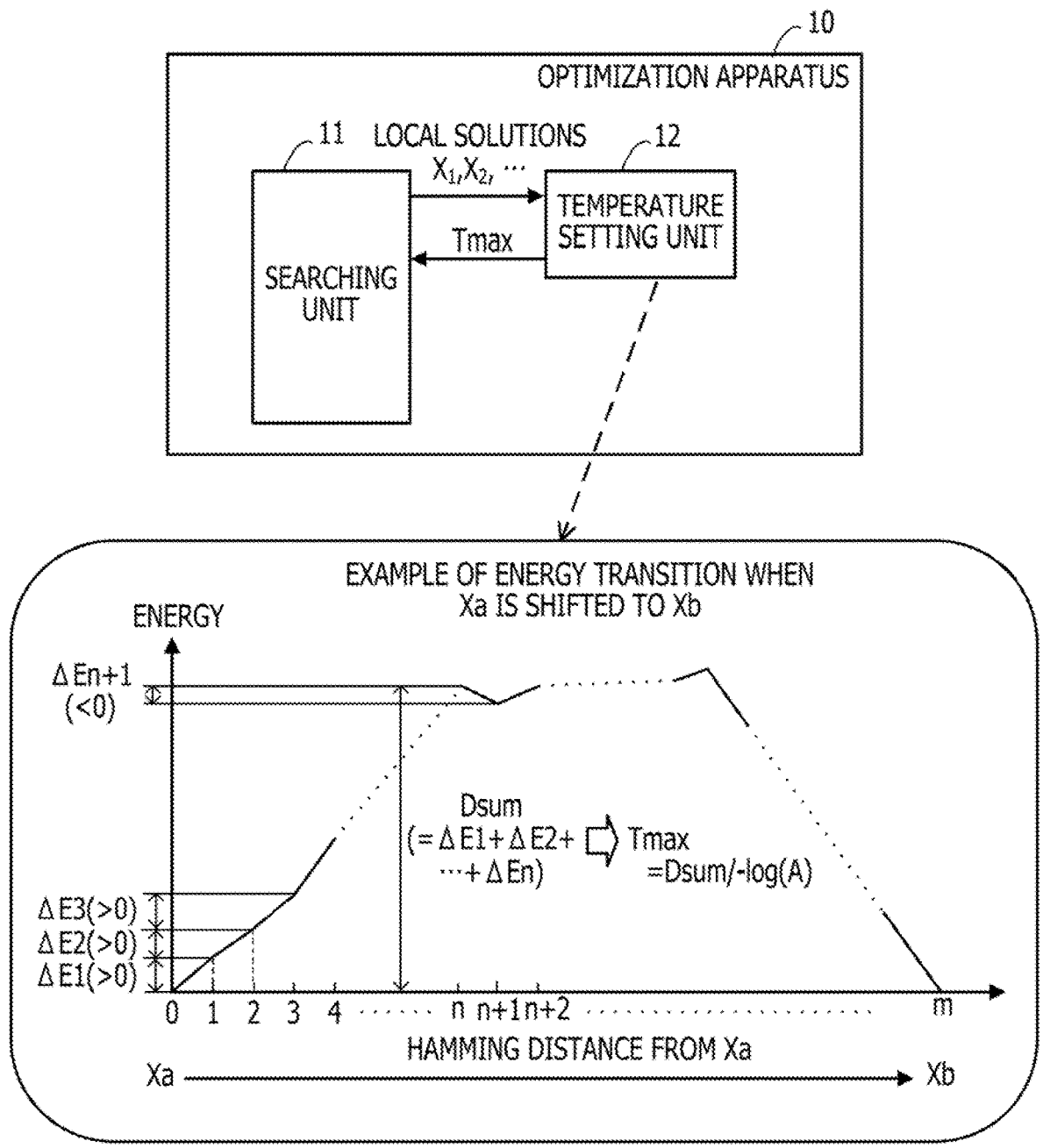
FIG. 1 is a diagram illustrating an example of an optimization apparatus according to a first embodiment.

FIG. 1 is a diagram illustrating an example of an optimization apparatus according to a first embodiment.

Figure 2:
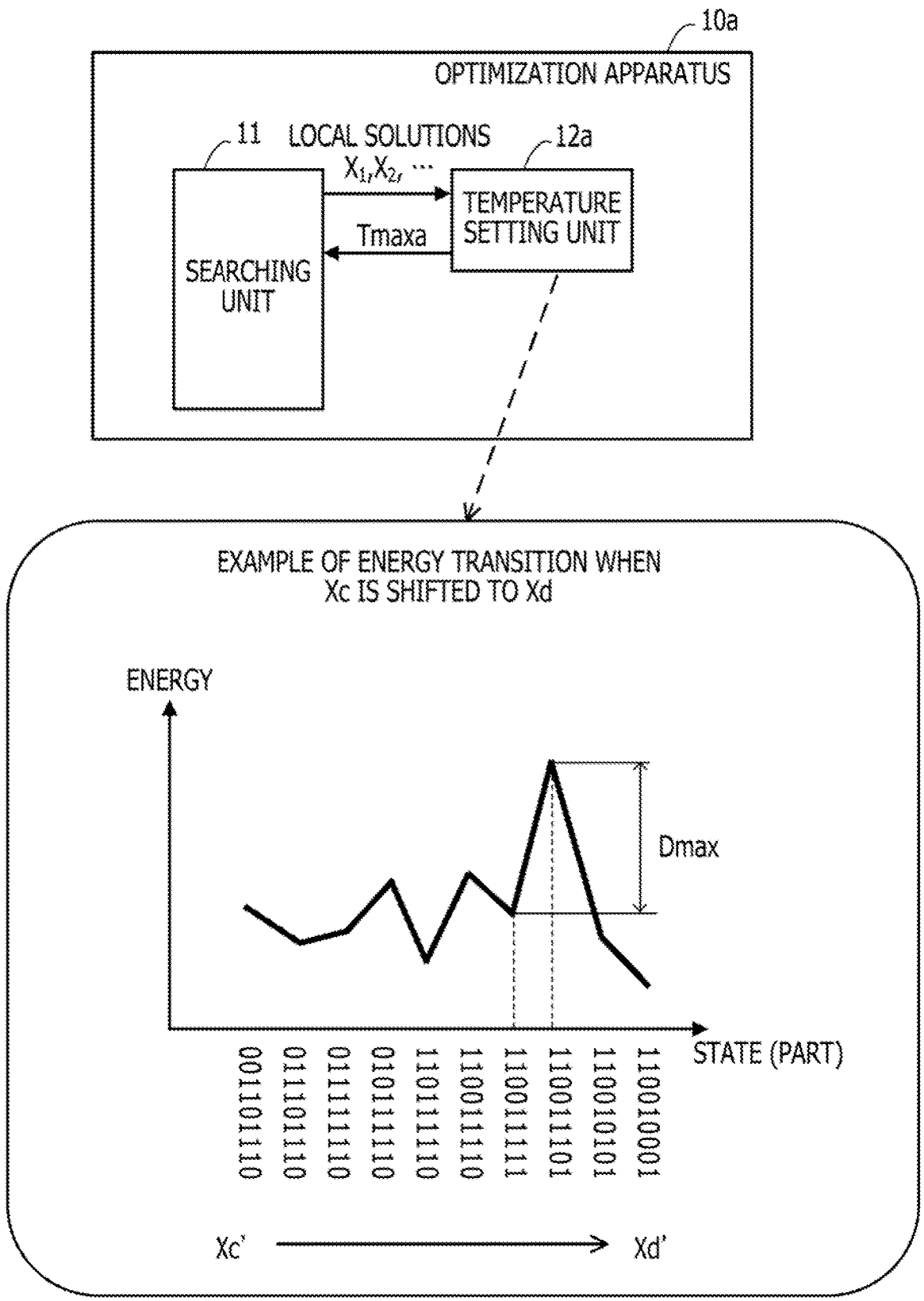
FIG. 2 is a diagram illustrating an optimization apparatus according to a comparison example.

FIG. 2 is a diagram illustrating an optimization apparatus according to a comparison example. In FIG. 2, the same elements as the elements illustrated in FIG. 1 are assigned with the same reference numerals.

First, an optimization apparatus 10a according to a comparison example illustrated in FIG. 2 is described.

The optimization apparatus 10a includes a searching unit 11 and a temperature setting unit 12a. The searching unit 11 may be implemented by, for example, an application-specific electronic circuit such as an application-specific integrated circuit (ASIC) or a field-programmable gate array (FPGA). The temperature setting unit 12a may be implemented by software processing resulting from execution of a program by a processor such as a central processing unit (CPU). Without limiting thereto, a part or all of each of the searching unit 11 and the temperature setting unit 12a may be implemented by using an electronic circuit as described above, or a part or all thereof may be implemented by software processing. The same is true for a temperature setting unit 12 in an optimization apparatus 10 according to a first embodiment, which is described below.

The searching unit 11 executes, by using a plurality of temperature values, search for a ground state of energy in an Ising model converted from a problem to be calculated and outputs a plurality of solutions (which is handled as local solutions hereinafter though the solutions are not limited to local solutions) ($X_1, X_2, \ldots$).

In the plurality of temperature values, a maximum temperature value corresponding to the highest temperature is an upper limit, and a minimum temperature value corresponding to the lowest temperature is a lower limit. When search by a simulated annealing method is performed in the searching unit 11, the temperature value is controlled so as to be gradually decrease from the maximum temperature value to the minimum temperature value in accordance with a predetermined temperature change schedule. When search by a replica-exchange method is performed in the searching unit 11, the number of temperature values equal to the number of replicas are used in the range from the minimum temperature value to the maximum temperature value.

The energy of the Ising model is defined by, for example, an energy function E(x) as expressed by the following Expression (1).

[Expression. 1]

$$E(x) = -\sum_{(i,j)} W_{ij} x_i x_j - \sum_i b_i x_i \qquad (1)$$

The first term on the right side adds up the products of two state variable values and a weight coefficient without missing and overlapping among all combinations of two state variables selectable from all state variables included in the Ising model. $x_i$ is the ith state variable. $x_j$ is the jth state variable. $W_{ij}$ is a weight coefficient indicating a weight (such as a strength of coupling) between the ith state variable and the jth state variable.

The second term on the right side is a sum of products of bias coefficients of all state variables and values of the state variables. $b_i$ represents a bias coefficient for the ith state variable.

For example, "−1" of a spin in the Ising model corresponds to a value "0" of the state variable. "+1" of the spin in the Ising model corresponds to a value "1" of the state variable. Therefore, the state variable may be called "bit" having a value of 0 or 1.

Based on a comparison result between an energy change caused when one bit of a plurality of bits is changed and a noise value, the searching unit 11 determines whether or not to accept the change of the bit. If the searching unit 11 determines to accept the change of the bit, the value of the bit is changed to cause a state transition. The noise value is acquired based on the temperature value described above or a random number. As the temperature value increases, the amplitude of the noise value increases.

When a simulated annealing method is performed, the temperature value is controlled so as to decrease in accordance with a predetermined temperature change schedule, and the processing including the determination on whether or not to accept the bit change and a state transition for each of the temperature values is repeated a predetermined number of times. The searching unit 11 outputs, as a local solution, the state (values of the state variables) acquired after the repeated processing is performed the predetermined number of time for the minimum temperature value, for example. After that, the temperature value is returned again to the maximum temperature value, and the same processing is repeated. Thus, a plurality of local solutions is acquired. In a case where the bit change is not accepted even when the comparison between an energy change and a noise value is performed a predetermined number of times, the searching unit 11 outputs the state at that time as a local solution. Alternatively, the searching unit 11 may update the energy every time a state transition is performed and output, as a local solution, the state with which the minimum value is acquired among the energies acquired through the repeated processing performed a predetermined number of times.

When a replica-exchange method is performed, temperature values different from each other between the maximum temperature value and the minimum temperature value are set for replicas. In each of the replicas, the processing including determination on whether or not to accept a bit change and a state transition is repeated, and exchange of states (or temperatures) is performed at a predetermined exchange probability between the replicas. The searching unit 11 updates the energy every time a state transition is performed in each of the replicas, for example, and outputs, as a local solution, a state with which a minimum value is acquired in each of the replicas among the energies acquired through the repeated processing performed a predetermined number of times.

The temperature setting unit 12a in the optimization apparatus 10a of the comparison example decides a new maximum temperature value in the manner which is described below based on $X_1, X_2, \ldots$ that are local solutions output from the searching unit 11 and sets the new maximum temperature value for the searching unit 11 instead of the maximum temperature value used up to this point.

When $X_1, X_2, \ldots$ are arranged in increasing order (ascending order) of energies, the temperature setting unit 12a selects local solutions in groups of two in increasing order of energies. When $X_1, X_2, \ldots$ are not arranged in ascending order, the temperature setting unit 12a also obtains energies corresponding to the local solutions from the searching unit 11 and arranges the local solutions in ascending order based on the obtained energies. The temperature setting unit 12a may compute the energy corresponding to each of the local solutions based on Expression (1) from the obtained local solutions.

Figure 3:
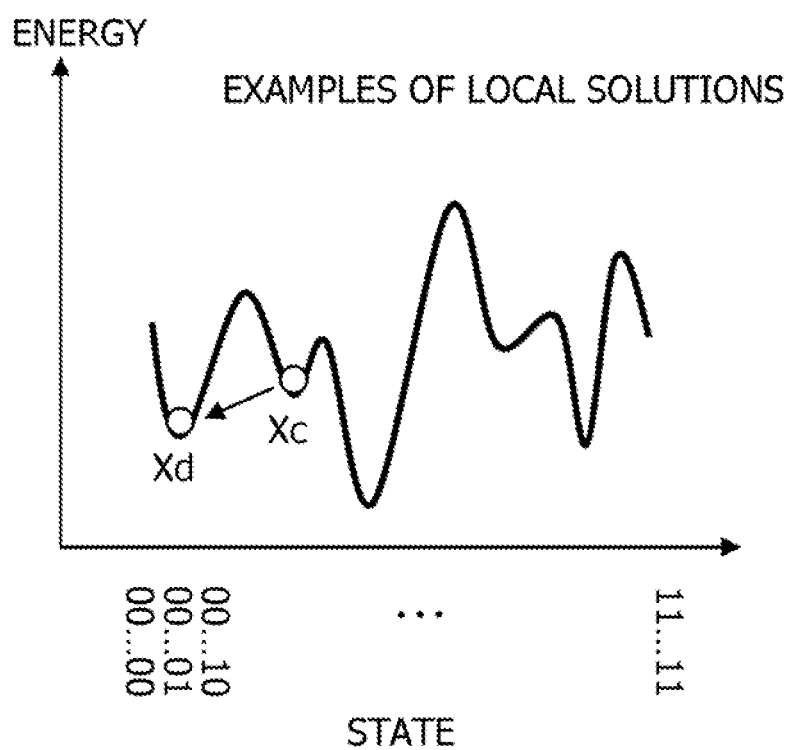
FIG. 3 is a diagram illustrating an example of a plurality of local solutions.

FIG. 3 is a diagram illustrating an example of the plurality of local solutions. FIG. 3 has a horizontal axis indicating state and a vertical axis indicating energy. A local solution is a state having an energy positioned at a valley of an energy landscape as illustrated in FIG. 3, and Xc and Xd are the local solutions, for example.

From a bit sequence of one local solution of the selected two local solutions, the temperature setting unit 12a extracts a plurality of bits different from bits of a bit sequence of the other local solution. The temperature setting unit 12a changes (inverts) the plurality of bits one by one and calculates an energy change ($\Delta E$) following the bit change. The temperature setting unit 12a may decide the order for changing the bits by greedy algorithm or randomly. According to greedy algorithm, the temperature setting unit 12a handles a bit resulting in minimum $\Delta E$ among the change candidate bits as a change target.

FIG. 2 illustrates an example of an energy transition caused when Xc is shifted to Xd by changing, one by one, a plurality of bits (Xc') different from the bit sequence of Xd in the bit sequence of Xc according to greedy algorithm so as to be matched with a plurality of bits (Xd') of Xd. FIG. 2 has a horizontal axis indicating a part of states (bit sequences resulting from changes of Xc' one by one) and a vertical axis indicating energy.

The temperature setting unit 12a calculates a maximum temperature value (Tmaxa) by the following Expression (2) by using a value (Dmax) with a maximum increase of energy among the calculated $\Delta E$s.

[Expression 2]

$$Tmaxa = \frac{Dmax}{\log(A)} \quad (2)$$

In Expression (2), A is a probability (transition acceptance probability) of acceptance of a state transition causing an energy increase of Dmax. A is preset for the temperature setting unit 12a. As one example, A=0.36785 (where Tmaxa has a substantially equal value to that of Dmax). log(A) is a natural logarithm of A.

The temperature setting unit 12a performs the same processing on the other pairs of local solutions and sets, for example, the largest Tmaxa among them for the searching unit 11.

The searching unit 11 uses the set Tmaxa as a new maximum temperature value and repeats the search for a ground state as described above.

The use of Tmaxa as described above as a maximum temperature value also allows acceptance of a state transition causing an energy increase like Dmax in FIG. 2 at a predetermined probability (such as A in Expression (2)) in the searching unit 11 and promotes the state to escape from the local solution.

In some problems (such as a spin-glass problem) to be calculated, an energy transition for shifting one local solution to another local solution is a transition in which energy continuously increases.

Figure 4:
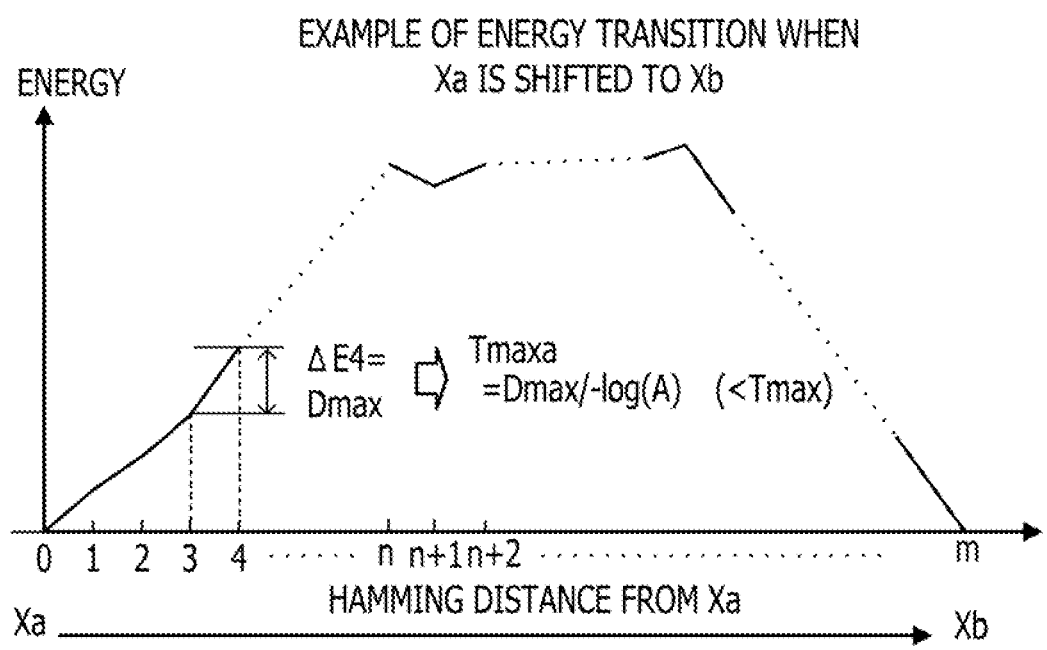
FIG. 4 is a diagram illustrating an example of an energy transition when one local solution is shifted to another local solution.

FIG. 4 is a diagram illustrating an example of an energy transition when one local solution is shifted to another local solution. FIG. 4 has a horizontal axis indicating hamming distance from one local solution (Xa) and a vertical axis indicating energy.

FIG. 4 illustrates an example of an energy transition when Xa is shifted to Xb by, when Xa is different from Xb by m bits, changing, one by one, the m bits different from the bit sequence of Xb in the bit sequence of Xa according to greedy algorithm. The example of the energy transition in FIG. 4 has a part in which energy continuously increases when the bits are changed one by one (a part in which the state after one bit change continuously climbs the mountain of energy).

The temperature setting unit 12a in the optimization apparatus 10a of the comparison example changes the m bits one by one as described above, and Tmaxa is computed based on Dmax with a maximum energy increase among $\Delta E$s following the changes. FIG. 4 illustrates an example in which $\Delta E4$ is Dmax.

However, when Tmaxa calculated based on Dmax is used, the state may not climb up the mountain of energy as illustrated in FIG. 4 if the state transition causing an energy increase like Dmax is not repeated many times, and the probability that the state may climb up the mountain is very low.

In other words, for example, there is a possibility that Tmaxa decided by the temperature setting unit 12a in the optimization apparatus 10a of the comparison example is a value that is too low to escape from the local solution.

On the other hand, the temperature setting unit 12 in the optimization apparatus 10 of the first embodiment illustrated in FIG. 1 decides the maximum temperature value (Tmax) as follows so that the case as described above may also be handled.

The temperature setting unit 12 selects local solutions in groups of two from $X_1, X_2, \ldots$ output from the searching unit 11. For example, the temperature setting unit 12 may select $X_1, X_2, \ldots$ in groups of two in increasing order of energies, like the temperature setting unit 12a as described above.

The temperature setting unit 12 sequentially performs processing for calculating a $\Delta E$ caused when the value of one of a plurality of bits of a bit sequence of one of the selected local solutions, which are different from those of the bit sequence of the other local solution, is changed on each of the plurality of bits. When an energy increase continuously occurs a plurality of number of times, the temperature setting unit 12 computes a total value of the energies increased in the plurality of number of times, unlike the temperature setting unit 12*a* described above. The temperature setting unit 12 decides a new Tmax based on the total value and sets the decided Tmax for the searching unit 11.

FIG. 1 illustrates an example of the energy transition similar to that of FIG. 4 described above. In the example in FIG. 1, ΔE>0 until Xa changes by n bits, and ΔEn+1<0 when Xa changes by n+1 bits. In other words, for example, an energy increase continuously occurs n times. In this case, the temperature setting unit 12 computes a total value (Dsum=ΔE1+ΔE2+ . . . +ΔEn) of energies increased in the n times.

The temperature setting unit 12 computes Tmax by the following Expression (3), for example.

[Expression 3]

$$T\max = -\frac{Dsum}{\log(A)} \quad (3)$$

Even in a case where there is a large mountain of energy that may not be crossed without a plurality of continuous energy increases between the two local solutions, the use of Tmax described above as the maximum temperature value allows crossing of the energy mountain at a relatively high probability. For example, at a probability given with A in Expression (2), such an energy mountain may be crossed. Thus, even against a problem (such as a spin-glass problem) having a large energy mountain as described above between two local solutions, a highest temperature adapted to the problem may be set. Therefore, the possibility for acquiring an optimum solution may be increased.

Second Embodiment

Figure 5:
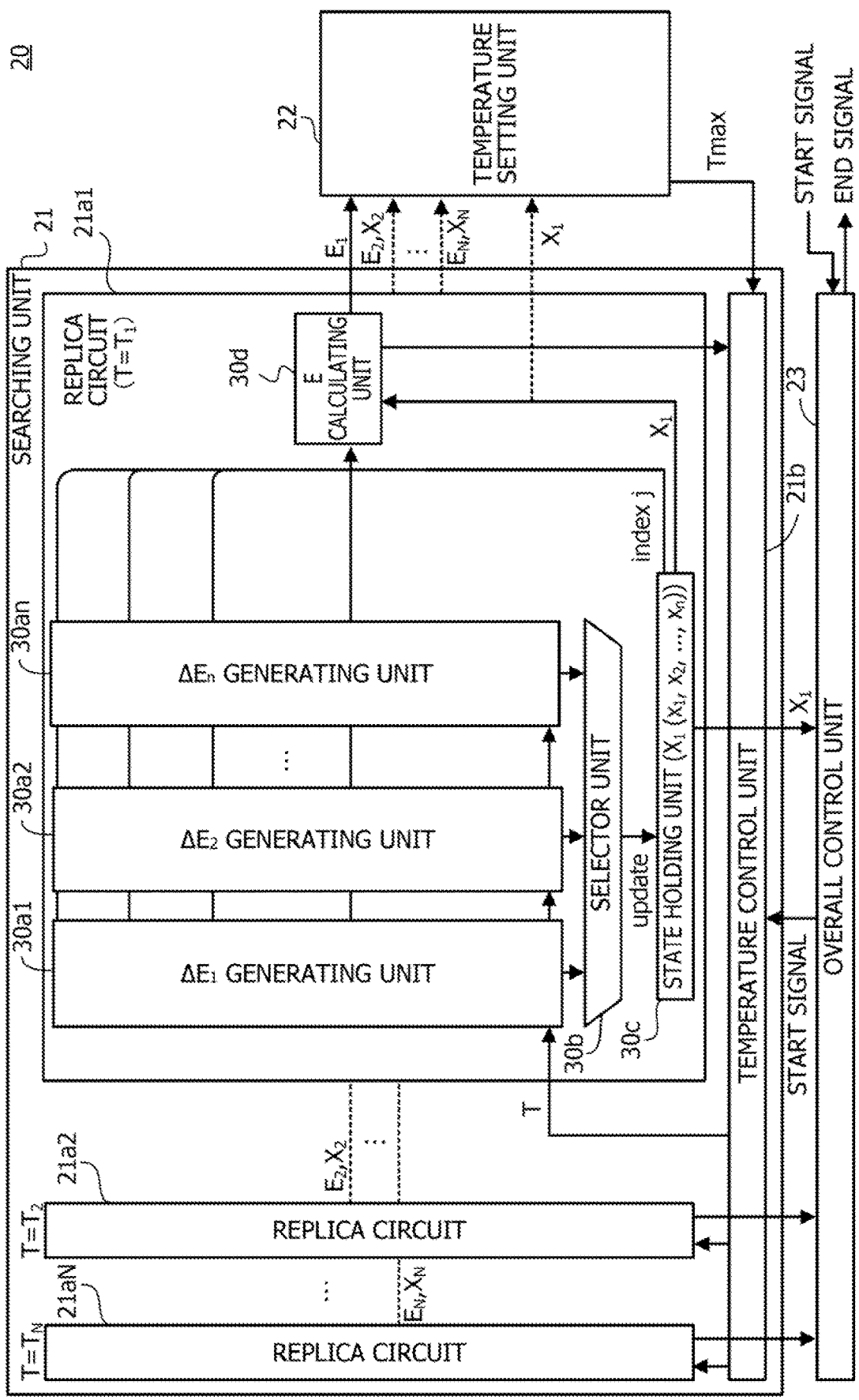
FIG. 5 is a diagram illustrating an example of an optimization apparatus according to a second embodiment.

FIG. 5 is a diagram illustrating an example of an optimization apparatus according to a second embodiment.

An optimization apparatus 20 according to the second embodiment includes a searching unit 21, a temperature setting unit 22, and an overall control unit 23.

The searching unit 21 may be implemented by an application-specific electronic circuit such as an ASIC or an FPGA. The temperature setting unit 22 and the overall control unit 23 may be implemented by software processing resulting from execution of a program by a processor such as a CPU. Without limiting thereto, a part or all of the searching unit 21, the temperature setting unit 22 and the overall control unit 23 may be implemented by using an electronic circuit as described above. A part or all of the searching unit 21, the temperature setting unit 22 and the overall control unit 23 may be implemented by software processing.

In the optimization apparatus 20 of the second embodiment, the searching unit 21 performs search for a ground state by a replica-exchange method.

The searching unit 21 includes replica circuits 21*a*1, 21*a*2, . . . , 21*a*N each corresponding to a replica. The searching unit 21 further includes a temperature control unit 21*b*.

Temperature values ($T_1$ to $T_N$) different from each other are set for the replica circuits 21*a*1 to 21*a*N, respectively. Initial temperatures $T_1$ to $T_N$ are defined based on the following Expressions (4) and (5) based on, for example, Tmax and Tmin (minimum temperature value) which are given in advance.

[Expression 4]

$$T_i = T\min \cdot \exp\left(\frac{i-1}{denom}\right) \quad (4)$$

[Expression 5]

$$denom = \frac{N-1}{\log\left(\frac{T\max}{T\min}\right)} \quad (5)$$

In Expression (4), $T_i$ is a temperature value set for the ith replica circuit among the replica circuits 21*a*1 to 21*a*N. In Expression (5), N is the number of replica circuits 21*a*1 to 21*a*N (the number of replicas).

Each of the replica circuits 21*a*1 to 21*a*N implements search for a ground state based on the energy function expressed by Expression (1) by using, for example, a circuit as described below. The replica circuits 21*a*2 to 21*a*N may be implemented by the same circuit configuration though the replica circuit 21*a*1 is mainly described below.

The replica circuit 21*a*1 includes ΔE generating units 30*a*1, 30*a*2, . . . , 30*an*, a selector unit 30*b*, a state holding unit 30*c*, and an E calculating unit 30*d*.

Referring to FIG. 5, a subscript "i" is given in the names of the ΔE generating units 30*a*1 to 30*an*, like "ΔE$_i$," generating unit, so that the correspondence to the ith bit may be easily understood. Each bit is identified by identification information called "index". For example, index of the ith bit is "i".

Processing for determining whether or not the value of one bit included in a state in one replica circuit is to be changed and, if the value is to be changed, changing the value of the corresponding bit corresponds to one process for searching a ground state by the replica circuit. The one process is repeatedly executed. The number of repetitions of the one process to be executed in parallel by the replica circuits 21*a*1 to 21*a*N may also be called "the number of iterations".

One replica circuit includes n ΔE generating units 30*a*1 to 30*an* (each of which is one unit in an arithmetic processing circuit that performs an arithmetic operation on one bit and may also be called "neuron" or "neuron circuit", for example). The n ΔE generating units 30*a*1 to 30*an* perform in parallel an arithmetic operation on the corresponding bits.

The arithmetic operation to be performed on the bits corresponding to the ΔE generating units 30*a*1 to 30*an* is arithmetic processing for determining whether or not to accept a change of the value of the bit based on a comparison result between an energy change in an Ising model, which is caused when the value of the bit is changed, and a noise value. When the value of the bit (state variable $x_i$) with index=i changes to $1-x_i$, a change of $x_i$ may be expressed as $\delta x_i = (1-x_i) - x_i = 1-2x_i$. Therefore, an energy change (ΔE$_i$) due to the change of the value of $x_i$ may be expressed by the following Expression (6) based on Expression (1).

[Expression 6]

$$\Delta E_i = E(x)|_{x_i \to 1-x_i} - E(x) \quad (6)$$

$$= -\delta x_i \left(\sum_j W_{ij} x_j + b_i\right)$$

-continued $$= -\delta x_i h_i$$

$$= \begin{cases} -h_i & \text{for } x_i = 0 \to 1 \\ +h_i & \text{for } x_i = 1 \to 0 \end{cases}$$

In Expression (6), h, may be expressed by the following Expression (7).

[Expression 7]

$$h_i = \sum_j W_{ij} x_j + b_i \tag{7}$$

Each of the $\Delta E$ generating units $30a1$ to $30an$ holds $h_i$ for $x_i$ and, from hi, acquires $\Delta E_i$ when the value of $x_i$ is changed based on Expression (6).

Hereinafter, the $\Delta E$ generating unit $30a1$ is mainly and exemplarily described. The $\Delta E$ generating units $30a2$ to $30an$ having the configuration under the same name also have the same function.

A bit corresponding to the $\Delta E$ generating unit $30a1$ is called "the bit", and a bit other than the bit computed by the replica circuit $21a1$ is called "the other bit".

The $\Delta E$ generating unit $30a1$ stores a weight coefficient ($W_{1j}$ (j=1 to n)) between the bit and the other bit. The subscript "j" of $W_{1j}$ indicates index of one bit including the bit (bit with index=1). In this case, $W_{11}=0$.

The $\Delta E$ generating unit $30a1$ calculates $h_1$ based on Expression (7) by using $W_{1j}$.

By using $h_1$ and based on Expression (6), the $\Delta E$ generating unit $30a1$ generates $\Delta E_1$ occurring when the value of the bit is changed. For example, from the current value of the bit supplied from the state holding unit $30c$, the $\Delta E$ generating unit $30a1$ may determine to which of 0 or 1 the value of the bit changes. The $\Delta E$ generating unit $30a1$ outputs the generated $\Delta E_1$ to the selector unit $30b$. The $\Delta E$ generating unit $30a1$ may output $-\Delta E_1$ acquired by inverting the sign of $\Delta E_1$. In this embodiment, it is assumed that the $\Delta E$ generating unit $30a1$ outputs $-\Delta E_1$.

The selector unit $30b$ outputs index of the bit to be inverted in accordance with $-\Delta E_1$ supplied from the $\Delta E$ generating unit $30a1$. For example, the selector unit $30b$ determines whether or not to accept the change of the value of the bit in accordance with a comparison result between $-\Delta E_1$ and the noise value corresponding to the temperature value set for the replica circuit $21a1$.

The determination on whether or not to accept the change of the value of the bit is described.

The acceptance probability ($A(\Delta E)$) for a state transition causing one energy change ($\Delta E$) differs between a case using a Metropolis method and a case using Gibbs method and may be expressed by the following Expression (8).

[Expression 8]

$$A(\Delta E) = \begin{cases} \min[1, \exp(-\beta \cdot \Delta E)] & \text{Metropolis} \\ 1/[1 + \exp(\beta \cdot \Delta E)] & \text{Gibbs} \end{cases} \tag{8}$$

Here, $\beta$ is a reciprocal (inverse temperature value) of the temperature value (T). The min operator indicates that a minimum value of the argument is taken. Hereinafter, $A(\Delta E)$ by both of the methods is written as $f(-\Delta E/T)$.

For example, a circuit that outputs a flag indicating that a state transition causing $\Delta E$ at a probability of $f(-\Delta E/T)$ is accepted may be implemented by a comparator that outputs a value according to a comparison between $f(-\Delta E/T)$ and a uniform random number u having a value in an interval [0,1].

However, it is possible to implement the same function also when the following modification is made. Even when the same monotonically increasing function is applied to two numbers, a magnitude relationship therebetween does not change. Therefore, even when the same monotonically increasing function is applied to two inputs of the comparator, the output of the comparator does not change. For example, it is possible to use $f^{-1}(-\Delta E/T)$ which is an inverse function of $f(-\Delta E/T)$ as a monotonically increasing function which is applied to $f(-\Delta E/T)$ and $f^{-1}(u)$ which is obtained by setting $-\Delta E/T$ of $f^{-1}(-\Delta E/T)$ to u as a monotonically increasing function which is applied to a uniform random number u. In this case, a circuit having the same function as the above-described comparator may be a circuit that outputs 1 when $-\Delta E/T$ is greater than $f^{-1}(u)$. Because T is positive, the $\Delta E$ generating unit $30a1$ may output a flag indicating that a state transition is accepted when $-\Delta E$ is equal to or higher than $T*f^{-1}(u)$ (or when $\Delta E$ is equal to or lower than $-(T*f^{-1}(u))$).

The $\Delta E$ generating unit $30a1$ generates the uniform random number u and generates a value of $f^{-1}(u)$ by using a conversion table for converting the generated uniform random number u into a value of $f^{-1}(u)$. For example, when Metropolis method is applied, a relationship $f^{-1}(u)=\log(u)$ is acquired, and the judgment formula may be expressed by the following Expression (9).

[Expression 9]

$$T \cdot \log(u) \leq -\Delta E \tag{9}$$

The conversion table is stored in, for example, a resistor. The $\Delta E$ generating unit $30al$ generates $(T*f^{-1}(u))$ that is a product of T and f(u) and compares it with $-\Delta E_1$. In this case, $T*f^{-1}(u)$ is the noise value described above. The noise value corresponds to thermal noise or thermal excitation energy. If $-\Delta E_1 \geq T*f^{-1}(u)$, the $\Delta E$ generating unit $30a1$ outputs $f_1=1$ as the flag indicating that the state transition is accepted. If $-\Delta E_1 < T*f^{-1}(u)$, the $\Delta E$ generating unit $30a1$ outputs $f_1=0$. $f_1=0$ indicates that the state transition is not accepted.

The $\Delta E$ generating unit $30a1$ may modify $-\Delta E_1 \geq T*f^{-1}(u)$ and output the flag indicating whether a state transition is to be accepted or not in accordance with a comparison between an evaluation value acquired by adding $T*f^{-1}(u)$ to $\Delta E_1$ and a threshold value (0, for example).

The selector unit $30b$ receives the flag output from each of the $\Delta E$ generating units $30a1$ to $30an$. If there is a flag indicating that the state transition is to be accepted among the flags output from the $\Delta E$ generating units $30a1$ to $30an$, the selector unit $30b$ selects one flag indicating the state transition is to be accepted. If there is not a flag indicating that the state transition is to be accepted among the flags output from the $\Delta E$ generating units $30a1$ to $30an$, the selector unit $30b$ selects a predetermined one flag.

The selector unit $30b$ outputs an update signal ("update") including the selected flag and index=j of the bit corresponding to the flag to the state holding unit $30c$.

The state holding unit $30c$ includes, for example, a resistor and holds the state ($X_1(x_1, x_2, \ldots, x_n)$) in the replica circuit $21a1$. The state holding unit $30c$ receives the flag and index output from the selector unit $30b$ and, for example, if the flag is 1, changes the value of the bit corresponding to the index and, if the flag is 0, does not change the values of all of the bits. The state holding unit 30c outputs the current $X_1$ to the E calculating unit 30d. The state holding unit 30c further outputs $X_1$ when a predetermined number of searches are completed or the searching processing in a predetermined period completes in the replica circuit 21a1 to the temperature setting unit 22 and the overall control unit 23. The state holding unit 30c further outputs index=j to each of the ΔE generating units 30a1 to 30an.

The E calculating unit 30d calculates the current energy ($E_1$) of the Ising model in the replica circuit 21a1 based on the current $X_1$ output from the state holding unit 30c. $E_1$ is defined by the energy function expressed in Expression (1). When a predetermined number of searches are completed or the searching processing in a predetermined period completes in the replica circuit 21a1, the E calculating unit 30d outputs the calculated $E_1$ to the temperature control unit 21b and the temperature setting unit 22.

The temperature control unit 21b sets T (one of $T_1$ to $T_N$) for a state transition determination circuit in each of the replica circuits 21a1 to 21aN. When Tmax is set by the temperature setting unit 22, the temperature control unit 21b may calculate $T_1$ to $T_N$ from Expressions (4) and (5) based on preset Tmin and the Tmax. When $T_1$ to $T_N$ are supplied from the temperature setting unit 22, the temperature control unit 21b sets the supplied $T_1$ to $T_N$ for the state transition determination circuits in the replica circuits 21a1 to 21aN, respectively.

The temperature control unit 21b controls the exchange of T (temperature exchange) in the replica circuits 21a1 to 21aN. With respect to a pair of replica circuits having temperature values adjacent to each other (a set of two replica circuits), the temperature control unit 21b determines, for each pair, whether the temperature exchange is to be performed or not based on an exchange probability ($p_{ij}$) expressed by the following Expression (10).

[Expression 10]

$$p_{ij} = \exp\left((E_i - E_j)\left(\frac{1}{kT_i} - \frac{1}{kT_j}\right)\right) \quad (10)$$

In Expression (10), $E_i$ is an energy corresponding to the local solution acquired in the ith replica circuit among the replica circuits 21a1 to 21aN. $E_j$ is an energy corresponding to the local solution acquired in the jth replica circuit. $T_i$ is a value that is a temperature value set for the ith replica circuit. $T_j$ is a temperature value set for the jth replica circuit. k is a Boltzmann constant.

The temperature control unit 21b supplies the temperature values after the exchanges to the replica circuits 21a1 to 21aN. For example, the temperature control unit 21b causes the resistor in the temperature control unit 21b to hold first correspondence information in which identification information (called "temperature index" or "temperature number") of a temperature value and the temperature value are associated. For example, the temperature indices are associated with temperature values in ascending order of the temperature values (as the temperature index increases, the temperature value also increases). The temperature control unit 21b further causes the resistor in the temperature control unit 21b to hold second correspondence information in which the temperature indices arranged in ascending order, for example, and identification numbers of the replica circuits 21a to 21aN are associated. In this case, for a pair of replica circuits corresponding to adjacent temperature indices in the second correspondence information, the set temperature values are adjacent to each other. Based on the first correspondence information and the second correspondence information, the temperature control unit 21b controls the temperature exchanges for the replica circuits 21a1 to 21aN and updates the second correspondence information in accordance with the performed exchanges. Based on the first correspondence information and the second correspondence information, the temperature control unit 21b supplies the temperature values to the replica circuits 21a1 to 21aN.

However, the temperature control unit 21b may hold correspondence information pieces in which the identification numbers of the replica circuits 21a1 to 21aN and the temperature values are associated and identify a pair of searching units having set temperature values adjacent to each other by sorting the correspondence information pieces by the temperature values.

Having described that the temperature values are exchanged between the replica circuits 21a1 to 21aN in the searching unit 21, states may be exchanged at the probability in Expression (10). However, exchanging the temperature values involves a smaller amount of information to be transmitted and received than exchanging the states.

The temperature setting unit 22 decides Tmax based on $X_1$ to $X_N$ that are local solutions in the replica circuits 21a1 to 21aN output from the searching unit 21 and sets it for the searching unit 21. The temperature setting unit 22 may calculate $T_1$ to $T_N$ from Expressions (4) and (5) based on the decided Tmax and the preset Tmin and output the calculated $T_1$ to $T_N$ to the searching unit 21. An example of the method for deciding Tmax by the temperature setting unit 22 is described below.

The overall control unit 23 controls overall operations of the optimization apparatus 20. When receiving input of a start signal from outside of the optimization apparatus 20, the overall control unit 23 outputs the start signal to the temperature control unit 21b and starts the searching unit 21 to cause the searching unit 21 to start processing for searching a ground state regarding an optimization problem. When the searching processing by the searching unit 21 ends, the overall control unit 23 obtains $X_1$ to $X_N$ from the searching unit 21 and acquires a solution for the optimization problem. For example, the overall control unit 23 handles the state corresponding to the lowest energy among the obtained $X_1$ to $X_N$ as the solution. The overall control unit 23 outputs an end signal indicating the end of the arithmetic processing to outside of the optimization apparatus 20. The end signal may include information indicating the solution acquired by the arithmetic processing. For example, the overall control unit 23 may output image information indicating the solution to a display device, not illustrated, coupled to the optimization apparatus 20 and causes the display device to display the image information indicating the solution to present details of the acquired solution to a user.

The overall control unit 23 may receive, for example, the aforementioned problem information (such as $W_{ij}$ and $b_i$) and an initial value of a state from outside of the optimization apparatus 20 and set them for the components (such as the ΔE generating units 30a1 to 30an and the state holding unit 30c) of the searching unit 21. The overall control unit 23 may receive an initial value of Tmax or Tmin from outside of the optimization apparatus 20 and set it for the temperature control unit 21b. The setting of the information above may be performed by another control unit.

When receiving input of a reset signal from outside of the optimization apparatus 20, the overall control unit 23 clears the information held by the searching unit 21 and the temperature setting unit 22.

(Example of Temperature Setting Unit 22)

Figure 6:
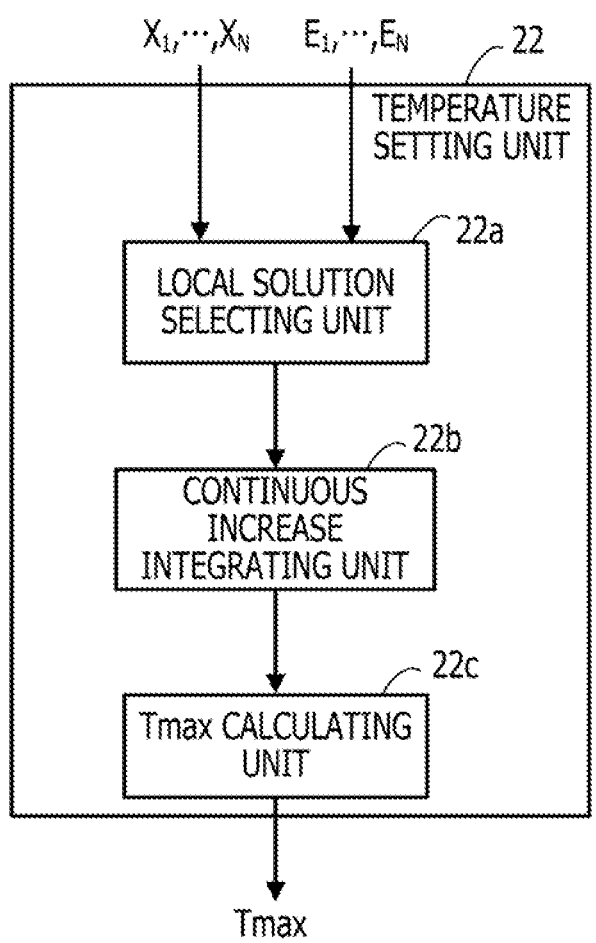
FIG. 6 is a diagram illustrating an example of a temperature setting unit.

FIG. 6 is a diagram illustrating an example of the temperature setting unit 22.

The temperature setting unit 22 includes a local solution selecting unit 22a, a continuous increase integrating unit 22b, and a Tmax calculating unit 22c.

The local solution selecting unit 22a obtains $X_1$ to $X_N$ that are local solutions in the replica circuits 21a1 to 21aN output from the searching unit 21 and $E_1$ to $E_N$ corresponding to $X_1$ to $X_N$, respectively. Hereinafter, N is equal to or higher than 3. The local solution selecting unit 22a arranges the N local solutions in increasing order (ascending order) of the energies and selects local solutions in groups of two in increasing order of the energies. The local solution selecting unit 22a may handle m (<N) local solutions in increasing order of energies as selection targets instead of handling all of N local solutions as selection targets. The local solution selecting unit 22a may select local solutions in groups of two randomly from $X_1$ to $X_N$ and, in this case, may not obtain $E_1$ to $E_N$.

The continuous increase integrating unit 22b sequentially performs processing for calculating ΔE occurring when one value of a plurality of bits (hereinafter, "set S") of a bit sequence of one of the selected two local solutions, which are different from the bits of the bit sequence of the other one, is changed on each of the bits belonging to the set S. The continuous increase integrating unit 22b calculates ΔE by the aforementioned Expressions (6) and (7), for example. Problem information ($W_{ij}$ and $b_i$) for calculating 6E by Expressions (6) and (7) is pre-stored in a storage unit, not illustrated, for example, and the continuous increase integrating unit 22b calculates ΔE by reading out the problem information from the storage unit.

The method for deciding the order for changing the bits may be greedy algorithm or a method that decides the order randomly. When greedy algorithm is applied, the continuous increase integrating unit 22b calculates, for each of the bits belonging to the set S, ΔE when the bit belonging to the set S is changed and changes the bit with the minimum ΔE.

When the bits belonging to the set S are sequentially changed and if an increase of energy occurs continuously a plurality of number of times, the continuous increase integrating unit 22b integrates the ΔEs to compute a total value (Dsum) of the energies increased in the plurality of number of times.

The Tmax calculating unit 22c calculates Tmax by Expression (3) based on Dsum calculated by the continuous increase integrating unit 22b for the pair of local solutions selected by the local solution selecting unit 22a and a predetermined transition acceptance probability (A). The Tmax calculating unit 22c outputs the maximum one of Tmax calculated for the pairs of local solutions (or sets it for the searching unit 21).

Examples of the continuous increase integrating unit 22b and the Tmax calculating unit 22c in a case where greedy algorithm is applied are described below.

Figure 7:
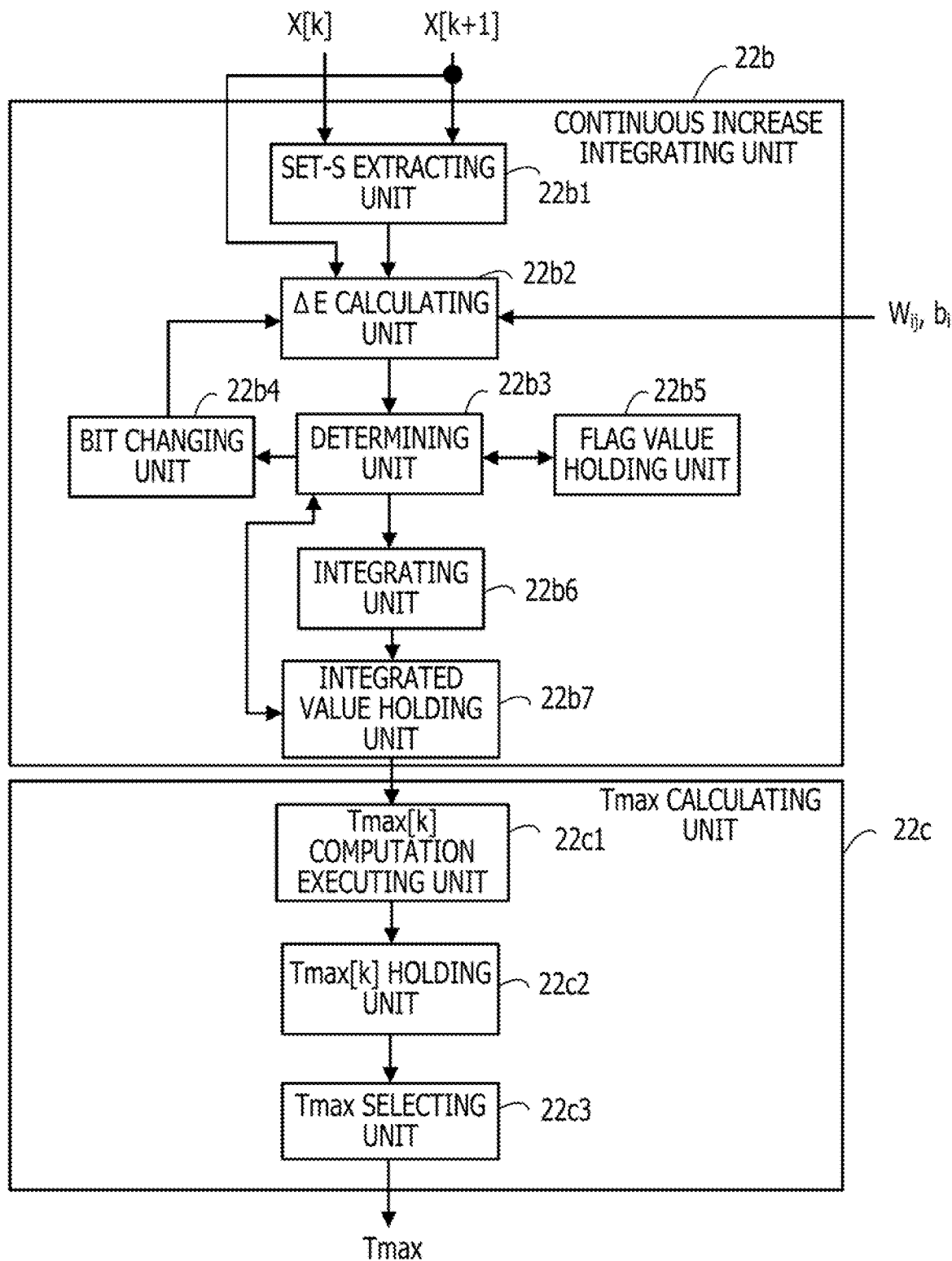
FIG. 7 is a diagram illustrating examples of a continuous increase integrating unit and a Tmax calculating unit.

FIG. 7 is a diagram illustrating examples of the continuous increase integrating unit 22b and the Tmax calculating unit 22c.

The continuous increase integrating unit 22b has a set-S extracting unit 22b1, a ΔE calculating unit 22b2, a determining unit 22b3, a bit changing unit 22b4, a flag value holding unit 22b5, an integrating unit 22b6, and an integrated value holding unit 22b7.

From a bit sequence of X[k+1] that is one of the two local solutions (hereinafter, X[k] and X[k+1]) selected by the local solution selecting unit 22a, the set-S extracting unit 22b1 extracts a set S that is a plurality of bits different from the bits of the bit sequence of X[k]. k is an identification number by which a local solution is identified. When k is, for example, 0 to N−2 and X[0] to X[N−1] are arranged in ascending order of energies, X[k] and X[k+1] indicate that they are local solutions with energies increasing as k increases.

For each of bits belonging to the set S, the ΔE calculating unit 22b2 calculates ΔE when the bit is changed by the aforementioned Expressions (6) and (7) based on the set S and X[k+1], $W_{ij}$, and $b_i$. Every time one of the bits belonging to the set S is changed by the bit changing unit 22b4, the ΔE calculating unit 22b2 repeats the same processing on the other bits excluding the changed bit.

The determining unit 22b3 selects a bit with minimum ΔE based on ΔEs calculated by the ΔE calculating unit 22b2 and outputs index for the bit to the bit changing unit 22b4. If the minimum ΔE is higher than 0 when k=0, the determining unit 22b3 further causes the flag value holding unit 22b5 to hold a flag value (hereinafter, "fa") indicating whether the energy is increasing or not by setting fa=1.

If the minimum ΔE is higher than 0 when k>0, the determining unit 22b3 refers to fa held in the flag value holding unit 22b5 and, if fa=0, updates it to fa=1 and, if fa=1, maintains fa as it is. If the minimum ΔE is equal to or lower than 0 when k>0, the determining unit 22b3 refers to fa held in the flag value holding unit 22b5 and, if fa=1, updates it to fa=0 and, if fa=0, maintains fa as it is.

If the minimum ΔE is higher than 0, the determining unit 22b3 outputs the ΔE to the integrating unit 22b6. If the minimum ΔE is equal to or lower than 0 and if the integrated value of ΔE at that time is higher than the maximum value up to that point of the integrated values acquired when X[k], X[k+1] are used, which are held in the integrated value holding unit 22b7, the determining unit 22b3 updates the maximum value with the integrated value. When the integrated value holding unit 22b7 holds a mean value of integrated values acquired when X[k] and X[k+1] are used, the determining unit 22b3 updates the mean value with the integrated value acquired at this time.

The bit changing unit 22b4 changes the value of the bit corresponding to index supplied from the determining unit 22b3 and outputs the changed value and index to the ΔE calculating unit 22b2.

The flag value holding unit 22b5 holds the value of fa described above.

The integrating unit 22b6 integrates ΔEs supplied from the determining unit 22b3 and causes the integrated value holding unit 22b7 to hold the integrated value.

The integrated value holding unit 22b7 holds the integrated values of ΔEs and a maximum value of the integrated values. The integrated value holding unit 22b7 may hold a mean value of the integrated values instead of holding a maximum value of the integrated values. The integrated values and a maximum value or mean value thereof are updated every time the value of k of X[k] and X[k+1] is changed, for example.

The Tmax calculating unit 22c has a Tmax[k] computation executing unit 22c1, a Tmax[k] holding unit 22c2 and a Tmax selecting unit 22c3.

The Tmax[k] computation executing unit 22c1 executes arithmetic processing on a maximum temperature value (Tmax[k]) when X[k] and X[k+1] are used. Tmax[k] may be acquired by calculating by using, as Dsum in Expression (3), a maximum value of the integrated values of ΔEs with respect to the value of k, which is held in the integrated value holding unit 22b7.

The Tmax[k] holding unit 22c2 holds Tmax[k] calculated by the Tmax[k] computation executing unit 22c1.

The Tmax selecting unit 22c3 outputs, as Tmax, one having a maximum value among Tmax[k] for each k held in the Tmax[k] holding unit 22c2. Thus, Tmax[k] may also be called a candidate value of the maximum temperature value. The Tmax selecting unit 22c3 calculates a mean value of Tmax[k] for k held in the Tmax[k] holding unit 22c2 and outputs the calculated mean value as Tmax.

Hereinafter, an example of operations of the optimization apparatus 20 is described.

(Example of Operations of Optimization Apparatus 20)

Figure 8:
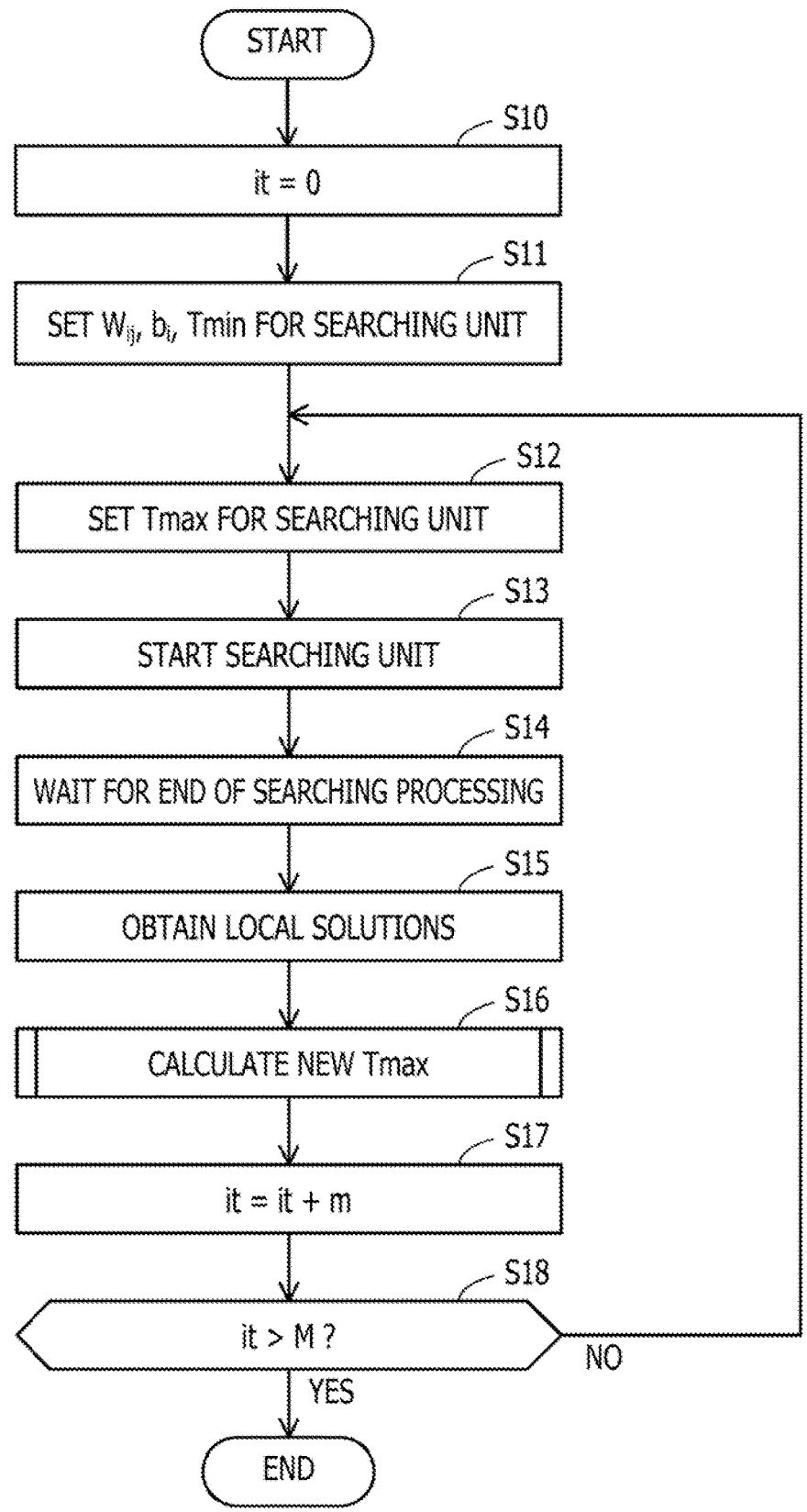
FIG. 8 is a flowchart illustrating a flow of an example of operations by an optimization apparatus.

FIG. 8 is a flowchart illustrating an example of operations of an optimization apparatus.

(S10) The overall control unit 23 substitutes 0 for a variable "it" (it=0) indicating the value of a counter that manages the number of iterations of the searching processing in the replica circuits 21a1 to 21aN.

(S11) The overall control unit 23 sets $W_{ij}$, $b_i$, the number of iterations for one start=m, and Tmin for the searching unit 21.

(S12) The overall control unit 23 or the temperature setting unit 22 sets Tmax for the searching unit 21. The initial value of Tmax is set for the searching unit 21 by the overall control unit 23, for example. After that, every time a local solution is output from the searching unit 21, new Tmax calculated based on the local solution is set by the temperature setting unit 22.

(S13) The overall control unit 23 starts the searching unit 21 by using a start signal.

(S14) The overall control unit 23 waits for the end of the searching processing by the searching unit 21.

(S15) The temperature setting unit 22 obtains N local solutions from the searching unit 21.

(S16) The temperature setting unit 22 performs calculation of new Tmax. A flow of the method for calculating Tmax is described below.

(S17) The overall control unit 23 adds m to it (it=it+m).

(S18) The overall control unit 23 determines whether it>M or not. M is a total number of iterations. If it>M, the processing ends. When the processing ends, the overall control unit 23 obtains $X_1$ to $X_N$ from the searching unit 21 and acquires a solution for the optimization problem. For example, the overall control unit 23 handles the state corresponding to the lowest energy among the obtained $X_1$ to $X_N$ as the solution. The overall control unit 23 outputs an end signal indicating the end of the arithmetic processing to outside of the optimization apparatus 20. If it≤M, the processing from step S12 is repeated.

As illustrated in steps S12 to S18, the temperature setting unit 22 calculates new Tmax based on newly obtained local solutions and repeatedly performs the processing for setting Tmax for the searching unit 21 so that there is a possibility that more proper Tmax may be set for the searching unit 21.

Figure 9:
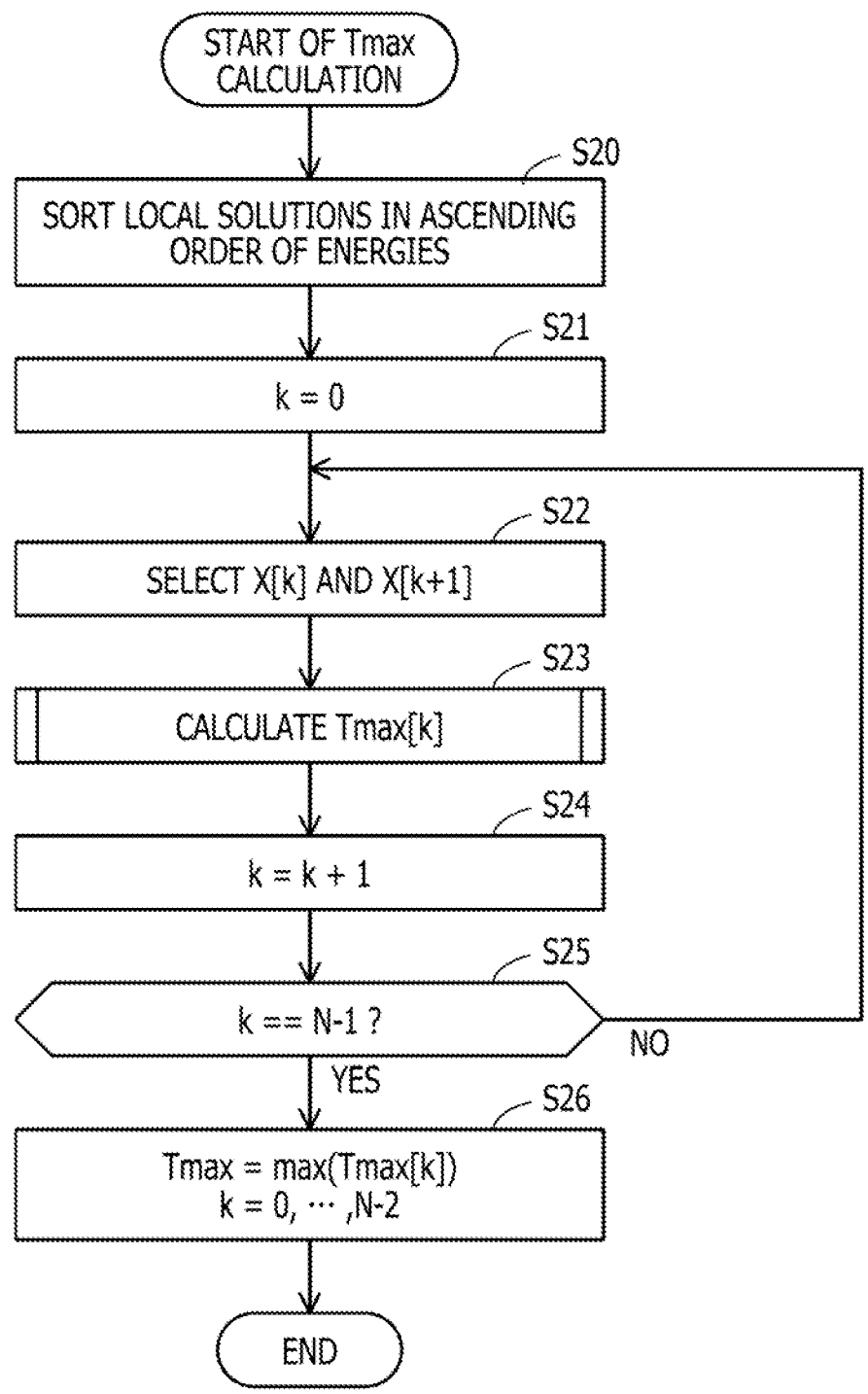
FIG. 9 is a flowchart illustrating a flow of an example of a method for calculating Tmax.

FIG. 9 is a flowchart illustrating a flow of an example of the method for calculating Tmax.

The processing in step S16 in FIG. 8 is performed by a flow of processing as illustrated in FIG. 9, for example.

(S20) The local solution selecting unit 22a in the temperature setting unit 22 sorts the local solutions ($X_1$ to $X_N$) obtained from the searching unit 21 in ascending order of the corresponding energies ($E_1$ to $E_N$).

(S21) The local solution selecting unit 22a substitutes 0 for k (k=0). Here, k is an identification number for identifying a local solution, as described above.

(S22) The local solution selecting unit 22a selects X[k] and X[k+1].

(S23) The continuous increase integrating unit 22b and the Tmax calculating unit 22c in the temperature setting unit 22 calculate Tmax[k] based on X[k] and X[k+1] selected by the local solution selecting unit 22a. A flow of processing for calculating Tmax[k] is described below.

(S24) The local solution selecting unit 22a increments k (k=k+1).

(S25) The local solution selecting unit 22a determines whether k is equal to N−1(k==N−1). If k is equal to N−1, the processing advances to step S26. If k is not equal to N−1, the processing from step S22 is repeated.

(S26) The Tmax calculating unit 22c in the temperature setting unit 22 calculates Tmax=max(Tmax[k]) (k=0, 1, ..., N−2). Here, max(Tmax[k]) indicates a maximum value among Tmax[0], Tmax[1], ..., Tmax[N−2] that are candidate values for the maximum temperature value. The calculation of new Tmax ends. The Tmax selecting unit 22c3 may handle a mean value of Tmax[0] to Tmax[N−2] as Tmax.

In step S26, if Tmax≤0, the Tmax calculating unit 22c uses Tmax calculated last time (in this case, it may be considered that the update of Tmax is not performed).

Figure 10:
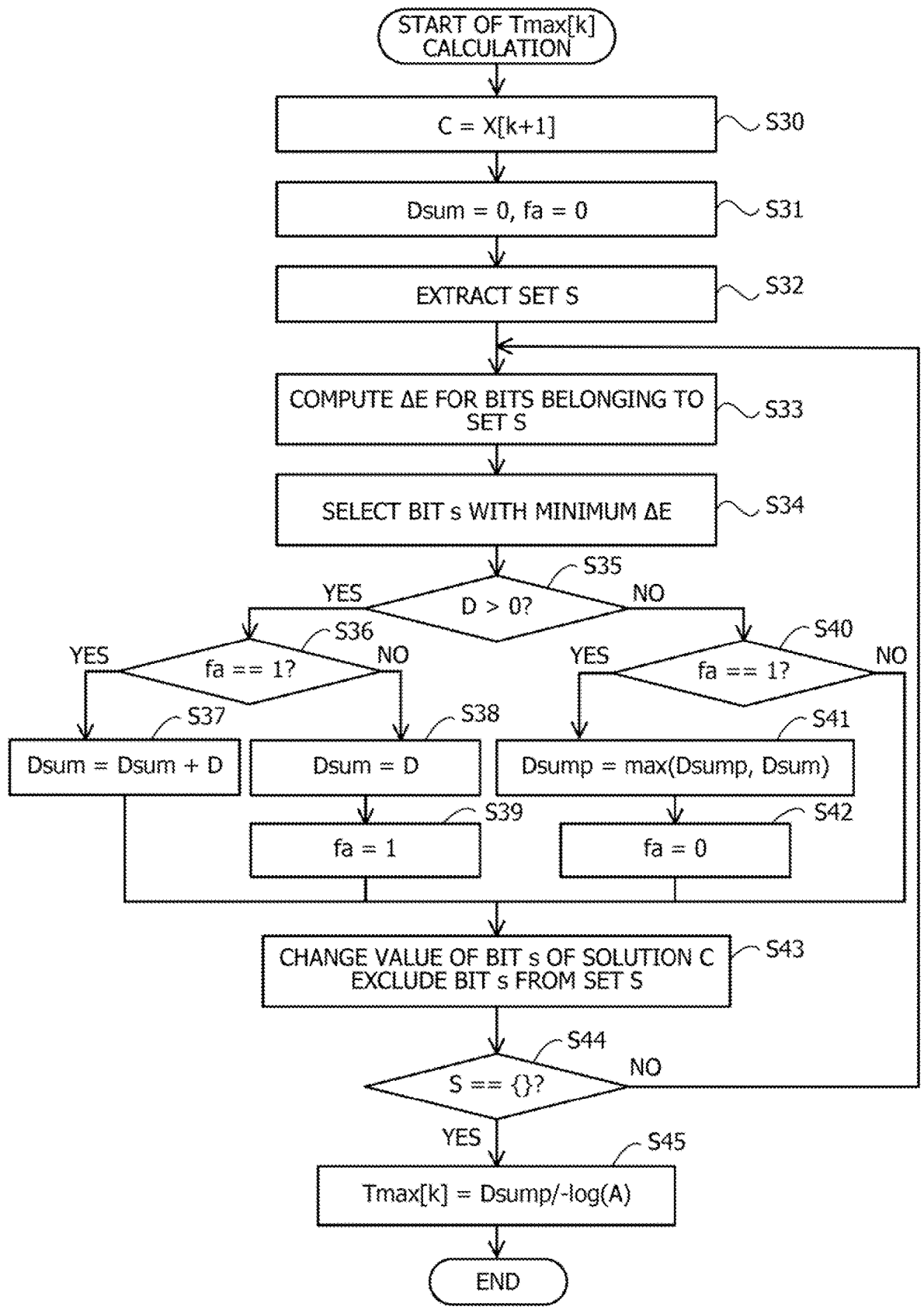
FIG. 10 is a flowchart illustrating a flow of an example of a processing for calculating Tmax[k]

FIG. 10 is a flowchart illustrating a flow of an example of processing for calculating Tmax[k].

The processing in step S23 in FIG. 9 is performed by the flow of processing as illustrated in FIG. 10, for example.

(S30) The set-S extracting unit 22b1 in the continuous increase integrating unit 22b in FIG. 7 sets solution C=X[k+1].

(S31) The determining unit 22b3 in the continuous increase integrating unit 22b sets 0 as Dsum to be held in the integrated value holding unit 22b7 and sets 0 as fa to be held in the flag value holding unit 22b5.

(S32) The set-S extracting unit 22b1 extracts the above-described set S between solution C and X[k].

(S33) For each of the bits belonging to the set S, the ΔE calculating unit 22b2 in the continuous increase integrating unit 22b calculates ΔE occurring when the bit is changed by the above-described Expressions (6) and (7).

(S34) The determining unit 22b3 in the continuous increase integrating unit 22b selects a bit s with minimum ΔE. For example, when ΔEs for all of the bits belonging to the set S are positive, the continuous increase integrating unit 22b selects a bit s with the smallest increase of energy. The determining unit 22b3 sets D=dE[s]. Here, dE[s] indicates ΔE for a change of the bit s in the solution C.

(S35) The determining unit 22b3 determines whether D>0 or not. If D>0, the processing advances to step S36, and, if D>0 is not satisfied, the processing advances to step S40.

(S36) The determining unit 22b3 determines whether fa held in the flag value holding unit 22b5 is 1 or not. If fa is 1, the processing advances to step S37, and if fa is not 1, the processing advances to step S38.

(S37) The integrating unit 22b6 adds D to Dsum held in the integrated value holding unit 22b7 (Dsum=Dsum+D). After that, the processing advances to step S43.

(S38) The integrating unit 22b6 substitutes D for Dsum held in the integrated value holding unit 22b7 (Dsum=D).

(S39) The determining unit 22b3 sets 1 as fa. After that, the processing advances to step S43.

(S40) The determining unit 22b3 determines whether fa held in the flag value holding unit 22b5 is 1 or not. If fa is 1, the processing advances to step S41, and if fa is not 1, the processing advances to step S43.

(S41) The determining unit 22b3 substitutes larger one of Dsump acquired up to this point and the current Dsum for Dsump indicating the maximum value of the integrated values held in the integrated value holding unit 22b7 (Dsump=max(Dsump, Dsum)). Dsump may be a mean value of Dsum acquired up to this point.

(S42) The determining unit 22b3 sets 0 as fa. After that, the processing advances to step S43.

(S43) The bit changing unit 22b4 changes the value of the bit s in the solution C and causes the bit s to be excluded from the set S for which ΔE is to be calculated in the ΔE calculating unit 22b2.

(S44) The determining unit 22b3 determines whether the set S is an empty set (or S=={ }). If the set S is an empty set, the processing advances to step S45. If the set S is not an empty set, the processing from step S33 is repeated.

(S45) The Tmax[k] computation executing unit 22c1 in the Tmax calculating unit 22c calculates Tmax[k]=Dsump/-log(A). Thus, the calculation of Tmax[k] ends.

The order of the processing steps in FIGS. 8 to 10 may be properly changed without limiting to the order described above.

(Advantages)

Figure 11:
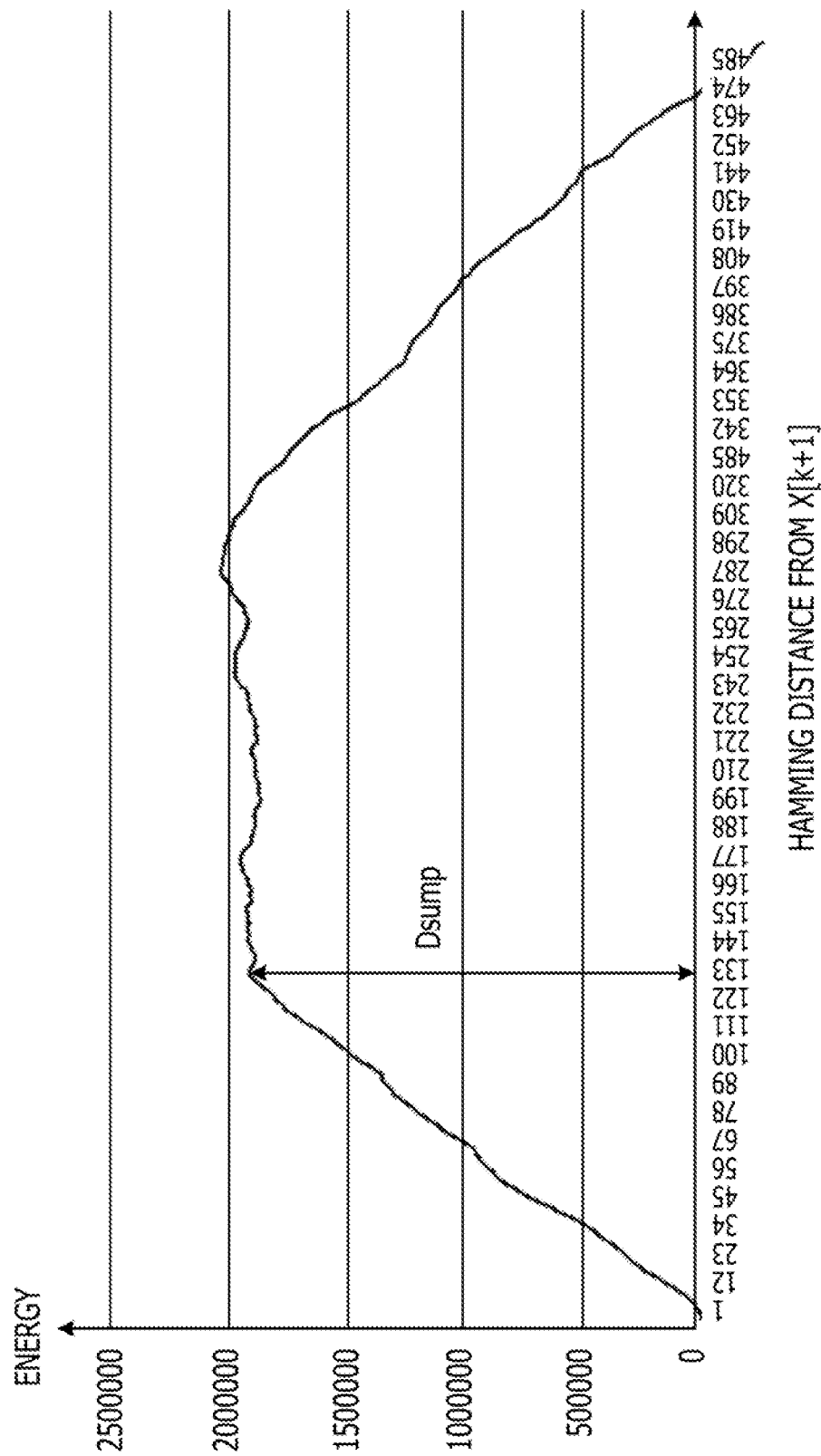
FIG. 11 is a diagram illustrating an example of an energy transition upon transition from X[k+1] to X[k] in calculation of a spin-glass problem.

FIG. 11 is a diagram illustrating an example of an energy transition when X[k+1] is shifted to X[k] in calculation of a spin-glass problem. FIG. 11 has a horizontal axis indicating a hamming distance from X[k+1] and a vertical axis indicating energy. It is assumed that the number n of bits indicating the size of the problem is 1024.

In the example in FIG. 11, X[k+1] and X[k] are different by about 470 bits, and an example of an energy transition caused by handling the set of those bits as the above-described set S and changing the bits one by one to X[k] by greedy algorithm is illustrated.

In the example of the energy transition in FIG. 11, there is a part where energy continuously increases (part where the state continuously climbs the mountain of the energy) when the bits are changed one by one.

Uke the method illustrated in FIG. 2, when a maximum temperature value is calculated based on Dmax with a maximum energy increase among ΔEs caused by changes of bits, the probability that the state climbs up the mountain of energy as illustrated in FIG. 11 is very low. This is because the state transition causing an energy increase like Dmax is to be repeated many times. In other words, for example, there is a possibility that the maximum temperature value calculated by the method illustrated in FIG. 2 is a value that is too low to escape from the local solution.

On the other hand, the temperature setting unit 22 in the optimization apparatus 20 of the second embodiment may decide Tmax corresponding to the mountain of energy as described above by deciding Tmax based on Dsump in the manner described above. In other words, for example, even in a case where there is a large energy mountain which may not be crossed without many continuous energy increases between X[k] and X[k+1], such a mountain may be crossed at a relatively high probability (such as A in Expression (2)). Thus, even for a problem (such as a spin-glass problem) having a large energy mountain as described above between two local solutions, Tmax adapted to the problem may be set. Therefore, the possibility for acquiring an optimum solution may be increased.

Instead of setting one Tmax[k] as Tmax, the temperature setting unit 22 calculates candidate values for a maximum temperature value for each of a plurality of pairs of local solutions selected from N local solutions and sets a maximum value of the candidate values or a mean value of the candidate values as Tmax. Thus, Tmax adapted to the problem to be calculated may be set.

Figure 12:
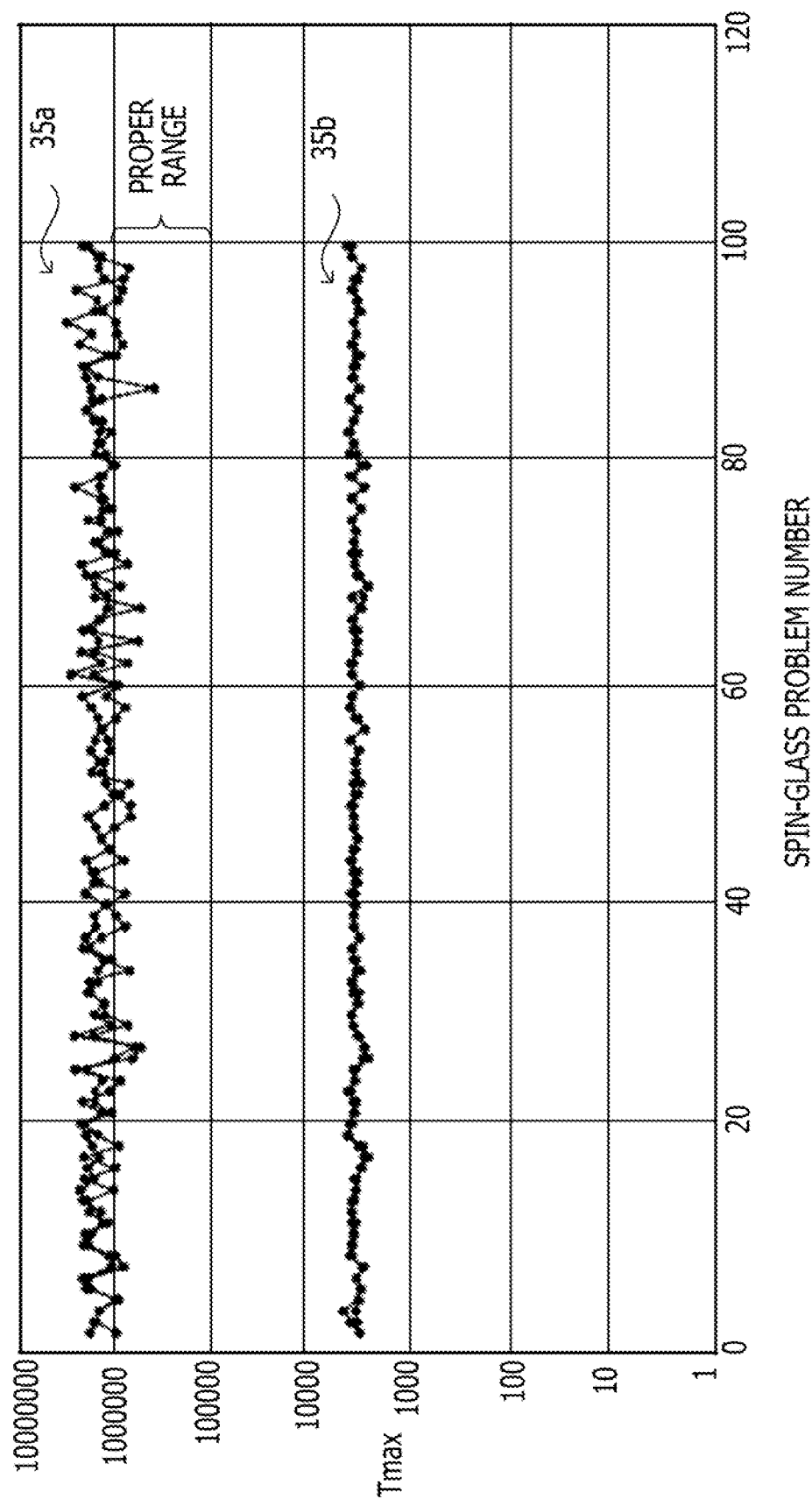
FIG. 12 is a diagram illustrating an example of Tmax acquired when 100 spin-glass problems with known correct solutions are calculated.

FIG. 12 is a diagram illustrating an example of Tmax acquired when 100 spin-glass problems with known correct solutions are calculated. FIG. 12 has a horizontal axis indicating problem numbers of 100 spin-glass problems and a vertical axis indicating Tmax.

Calculation results 35a indicate calculation results of Tmax by the temperature setting unit 22 in the optimization apparatus 20 of the second embodiment. Calculation results 35b indicate calculation results of Tmax calculated based on Dmax like the temperature setting unit 12a in the optimization apparatus 10a of the above-described comparison example instead of the temperature setting unit 22 in the optimization apparatus 20. In each of the calculation results 35a and 35b, calculation results in a case where two total numbers of iterations ($10^6$ iterations and $10^7$ iterations) are applied in the searching unit 21 are overlapped.

A proper Tmax range (range of Tmax from which correct solutions are acquired) set for the searching unit 21 by the inventor of the subject application was a range of Tmax=$10^5$ to $10^6$. According to the technique using Dmax, lower values than the proper Tmax range were acquired like the calculation results 35b. On the other hand, according to the technique with the temperature setting unit 22, values included in the proper Tmax range were acquired like the calculation results 35a.

Figure 13:
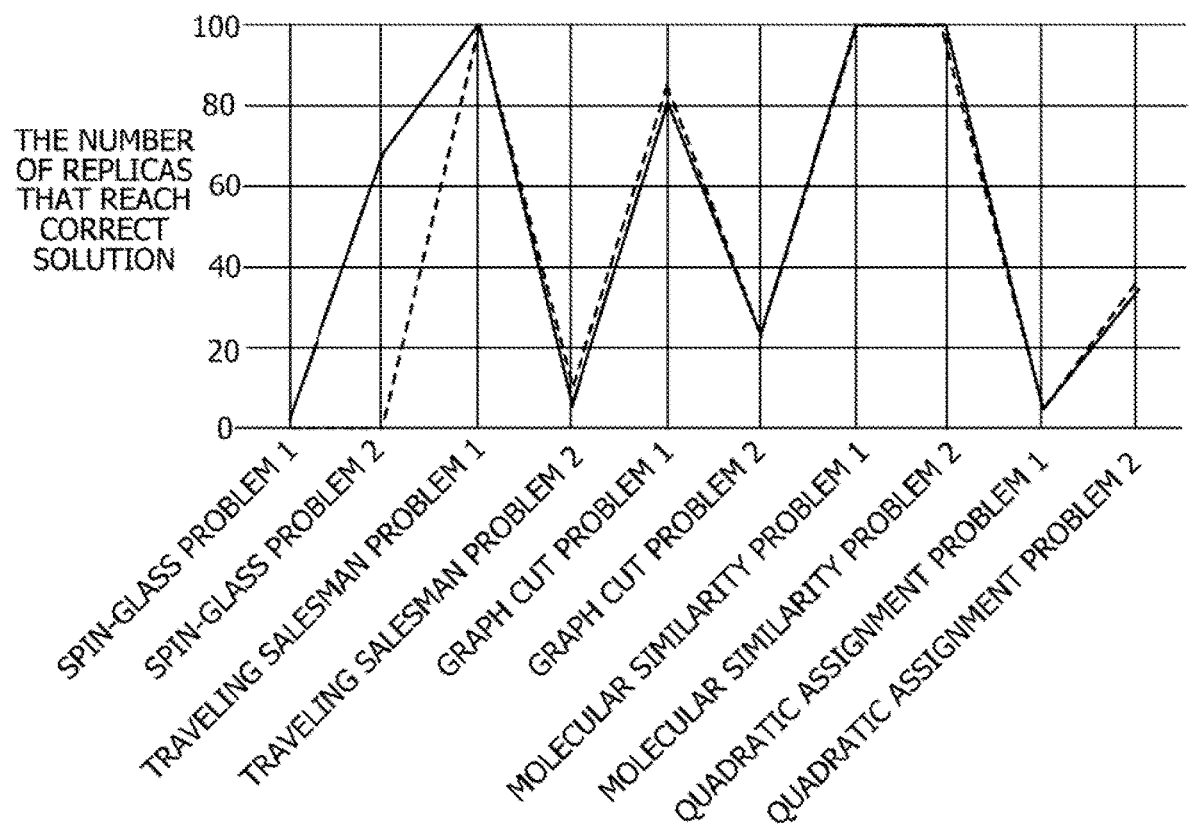
FIG. 13 is a diagram illustrating a result of an example of the number of replicas that reach correct solutions for a plurality of kinds of problems.

FIG. 13 is a diagram illustrating results of examples of the number of replicas that reach a correct solution for a plurality of kinds of problems. FIG. 13 has a horizontal axis indicating various kinds of combinatorial optimization problems and a vertical axis indicating the number of replicas (the number of replica circuits) that reach a correct solution. FIG. 13 illustrates a solid line indicating an experiment result in a case where the technique with the optimization apparatus 20 of the second embodiment is used and a broken line indicating an experiment result in a case where the technique for calculating Tmax based on Dmax as in the aforementioned comparison example is used.

The expression "reach a correct solution" refers to a state that a known lowest energy is obtained for each of problems. As experiment conditions, the total number of iterations=$10^7$ and the number of the replica circuits 21a1 to 21aN=100 were applied. The number of replicas that reach correct solutions illustrated in FIG. 13 is a mean value of the numbers of replicas that have reached a correct solution when 10 trials were performed under the experiment conditions. For each of the trials, the seed of the uniform random number used in the searching unit 21 differs.

The combinatorial problems to be calculated are two kinds of spin-glass problems, traveling salesman problems, graph cut problems, molecular similarity problems, and quadratic assignment problems.

As illustrated in FIG. 13, in a case where the technique with the optimization apparatus 20 of the second embodiment was used, the number of replicas that reached a correct solution for a spin-glass problem 1 was 2.5, and the number of replicas that reached a correct solution for a spin-glass problem 2 was 68.6. In other words, for example, solutions for the spin-glass problems the solutions of which may not be acquired by the technique of the comparison example may also be acquired. Also for the other problems, substantially equivalent results to those by the technique of the comparison example were acquired.

Third Embodiment

Figure 14:
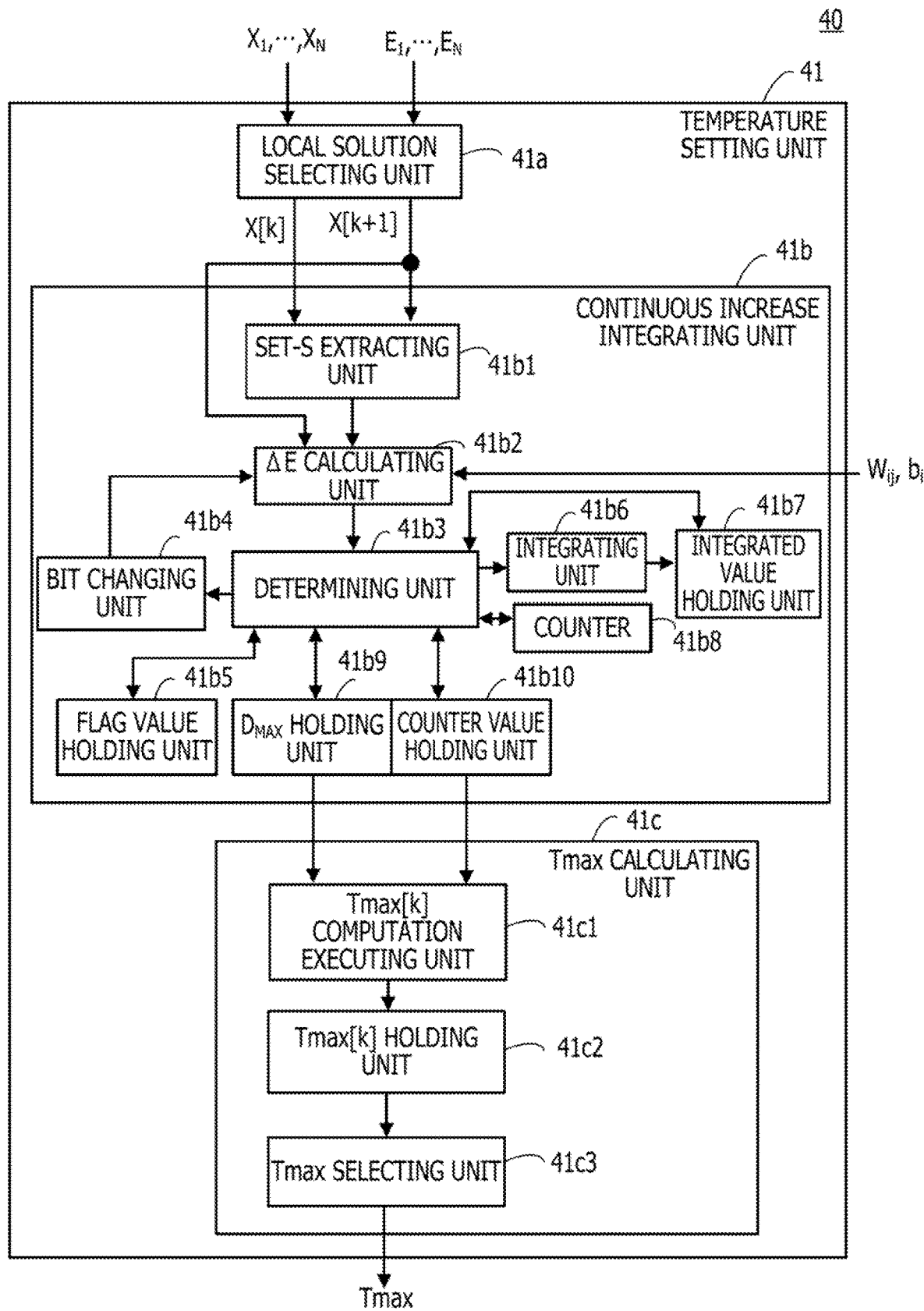
FIG. 14 is a diagram illustrating an example of an optimization apparatus according to a third embodiment.

FIG. 14 is a diagram illustrating an example of an optimization apparatus according to a third embodiment.

FIG. 14 does not illustrate a part of the same elements (searching unit 21 and overall control unit 23) as those of the optimization apparatus 20 illustrated in FIG. 5.

A temperature setting unit 41 in an optimization apparatus 40 of the third embodiment includes a local solution selecting unit 41a, a continuous increase integrating unit 41b, and a Tmax calculating unit 41c.

The components of the temperature setting unit 41 may be implemented by an application-specific electronic circuit such as an ASIC or an FPGA, for example. The components of the temperature setting unit 41 may be implemented by software processing resulting from execution of a program by a processor such as a CPU. Without limiting thereto, the temperature setting unit 41 may be implemented by both of an electronic circuit as described above and software processing resulting from execution of a program by a processor.

The local solution selecting unit 41a implements the same function as that of the local solution selecting unit 22a in the temperature setting unit 22 illustrated in FIG. 6. In other words, for example, the local solution selecting unit 22a obtains $X_1$ to $X_N$ that are local solutions in the replica circuits 21a1 to 21aN output from the searching unit 21 and $E_1$ to $E_N$ corresponding to $X_1$ to $X_N$, respectively. The local solution selecting unit 41a arranges the N local solutions in increasing order (ascending order) of the energies and selects local solutions in groups of two in increasing order of the energies. The local solution selecting unit 41a may handle m (<N) local solutions in increasing order of energies as selection targets instead of handling all of N local solutions as selection targets.

The continuous increase integrating unit 41b first performs the following processing like the continuous increase integrating unit 22b illustrated in FIG. 6. The continuous increase integrating unit 41b sequentially performs processing for calculating ΔE occurring when one value of a plurality of bits (hereinafter, "set S") of one bit sequence of the selected two local solutions, which are different from the other bit sequence, is changed on each of the bits belonging to the set S. When the bits belonging to the set S are sequentially changed and if an increase of energy occurs continuously a plurality of number of times, the continuous increase integrating unit 41b integrates the ΔEs.

However, unlike the continuous increase integrating unit 22b illustrated in FIG. 6, when an increase of energy occurs continuously a plurality of number of times, the continuous increase integrating unit 41b increments the number of times (counter value) by +1 and holds a maximum increase value ($D_{MAX}$) among the plurality of energy increases. Every time the continuous increases of energy end, the continuous increase integrating unit 41b updates the maximum value with the integrated value of ΔEs at that time if the integrated value of ΔEs at that time is higher than the maximum value up to that point of the integrated values acquired when X[k], X[k+1] are used, which are held in the integrated value holding unit 41b7. The continuous increase integrating unit 41b holds the counter value and $D_{MAX}$ acquired when the maximum value of the integrated values of ΔEs is acquired. Hereinafter, the counter value and $D_{MAX}$ acquired when the maximum integrated value is acquired are called cntp and $D_{MAXp}$, respectively.

Based on cntp and $D_{MAXp}$ held upon end of the processing by the continuous increase integrating unit 41b on pairs of all local solutions and the predetermined transition acceptance probability (A), the Tmax calculating unit 41c calculates Tmax by the following Expression (11).

[Expression 11]

$$T\max = -\frac{D_{MAXp}}{\log(A^{(1/cntp)})} \qquad (11)$$

The Tmax calculating unit 41c outputs (sets for the searching unit 21) a maximum one of Tmax calculated for pairs of local solutions.

FIG. 14 illustrates examples of the continuous increase integrating unit 41b and the Tmax calculating unit 41c.

The continuous increase integrating unit 41b includes a set-S extracting unit 41b, a ΔE calculating unit 41b2, a determining unit 41b3, a bit changing unit 41b4, a flag value holding unit 41b5, an integrating unit 41b6, and an integrated value holding unit 41b7, like the continuous increase integrating unit 22b illustrated in FIG. 7. The continuous increase integrating unit 41b further includes a counter 41b8, a $D_{MAX}$ holding unit 41b9, and a counter value holding unit 41b10.

From a bit sequence of X[k+1] of two local solutions (hereinafter, X[k] and X[k+1]) selected by the local solution selecting unit 41a, the set-S extracting unit 41b1 extracts a set S that is a plurality of bits different from the bits of the bit sequence of X[k], like the set-S extracting unit 22b illustrated in FIG. 7.

For each of the bits belonging to the set S, the ΔE calculating unit 41b2 calculates ΔE when the bit is changed, like the ΔE calculating unit 22b2 in FIG. 7. Every time one of the bits belonging to the set S is changed by the bit changing unit 41b4, the ΔE calculating unit 41b2 repeats the same processing on the other bits excluding the changed bit.

The determining unit 41b3 selects a bit with minimum ΔE based on ΔEs computed by the ΔE calculating unit 41b2 and outputs index for the bit to the bit changing unit 41b4, like the determining unit 22b3 in FIG. 7. The determining unit 41b3 updates or maintains the flag value (fa) held in the flag value holding unit 22b5 in accordance with the values of k and ΔE, like the determining unit 22b3. If the minimum ΔE is higher than 0, the determining unit 41b3 outputs the ΔE to the integrating unit 41b6.

The determining unit 41b3 further outputs a count-up signal that increments the counter value by +1 to the counter 41b8 every time an energy increase continuously occurs, unlike the determining unit 22b3. The determining unit 41b3 causes the $D_{MAX}$ holding unit 41b9 to hold Dr that is a maximum increase value of the plurality of continuous energy increases.

Every time the continuous increases of energy end, the determining unit 41b3 determines whether or not the integrated value of ΔEs at that time is higher than the maximum value up to that point of the integrated values acquired when X[k], X[k+1] are used, which are held in the integrated value holding unit 41b7. If the integrated value of ΔEs at that time is higher than the maximum value up to that point, the determining unit 41b3 updates the maximum value held in the integrated value holding unit 41b7 with the integrated value.

The determining unit 41b3 causes the counter value holding unit 41b10 to hold cntp that is a counter value when the maximum value is acquired and causes the $D_{MAX}$ holding unit 41b9 to hold $D_{MAXp}$ that is a $D_{MAX}$ when the maximum value is acquired.

The bit changing unit 41b4 changes the value of the bit corresponding to index supplied from the determining unit 41b3 and outputs the changed value and index to the ΔE calculating unit 41b2, like the bit changing unit 22b4 in FIG. 7.

The flag value holding unit 41b5 holds the value of fa described above.

The integrating unit 41b6 integrates ΔEs supplied from the determining unit 41b3 and causes the integrated value holding unit 41b7 to hold the integrated value, like the integrating unit 22b6 in FIG. 7.

The integrated value holding unit 41b7 holds integrated values of ΔEs and a maximum value of the integrated values.

The counter 41b8 increments the counter value by +1 every time the determining unit 41b3 outputs a count-up signal.

The $D_{MAX}$ holding unit 41b9 holds $D_{MAX}$ supplied from the determining unit 41b3 and holds $D_{MAXp}$ that is $D_{MAX}$ when a maximum value of integrated values of ΔEs is acquired.

The counter value holding unit 41b10 holds cntp that is a counter value when a maximum value of integrated values of ΔEs is acquired.

The Tmax calculating unit 41c includes a Tmax[k] computation executing unit 41c1, a Tmax[k] holding unit 41c2, and a Tmax selecting unit 41c3.

The Tmax[k] computation executing unit 41c1 executes computation of a maximum temperature value (Tmax[k]) when X[k] and X[k+1] are used. Tmax[k] is acquired by calculating Expression (12) based on $D_{MAXp}$ for the k, which is held in the $D_{MAX}$ holding unit 41b9, and cntp for the k, which is held in the counter value holding unit 41b10.

The Tmax[k] holding unit 41c2 holds Tmax[k] calculated by the Tmax[k] computation executing unit 41c1.

The Tmax selecting unit 41c3 outputs, as Tmax, a maximum value of Tmax[k] for each k, which is held in the Tmax[k] holding unit 41c2. The Tmax selecting unit 41c3 may calculate a mean value of Tmax[k] for k, which is held in the Tmax[k] holding unit 22c2, and output the calculated mean value as Tmax.

A flow of an example of Tmax[k] calculation processing in the optimization apparatus 40 of the third embodiment is described below. The same processing as the processing in the optimization apparatus 20 illustrated in FIGS. 8 and 9 is performed in the other operations.

Figure 15:
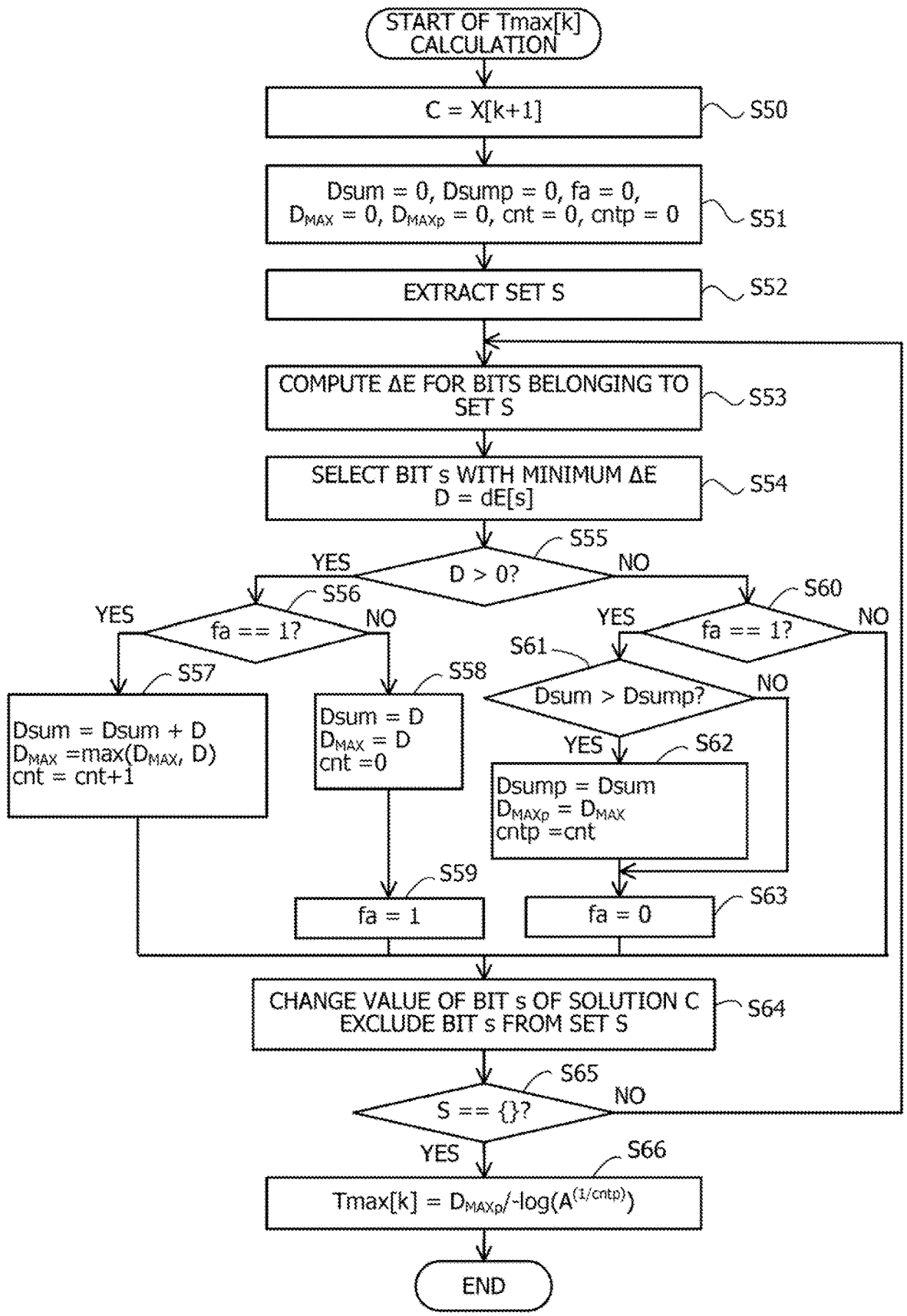
FIG. 15 is a flowchart illustrating a flow of an example of processing for calculating Tmax[k]

FIG. 15 is a flowchart illustrating a flow of an example of processing for calculating Tmax[k].

Because the processing in step S50 is the same as the processing in step S30 illustrated in FIG. 10, the description is omitted.

(S51) The determining unit 41b3 in the continuous increase integrating unit 41b sets 0 as Dsum that is an integrated value of ΔE and a maximum value Dsump thereof to be held in the integrated value holding unit 41b7. The determining unit 41b3 further sets 0 as fa to be held in the flag value holding unit 41b5, $D_{MAX}$ and $D_{MAXp}$ to be held in the $D_{MAX}$ holding unit 41b9, the counter value cnt of the counter 41b8, and cntp described above to be held in the counter value holding unit 41b10.

Because the processing in the subsequent steps S52 to S56 is the same as the processing in steps S32 to S36 illustrated in FIG. 10, the description is omitted.

(S57) If fa is 1, the integrating unit 41b6 adds D (ΔE for a change of the bit s in the solution C) to Dsum that is an integrated value of ΔEs held in the integrated value holding unit 41b7 (Dsum=Dsum+D). The determining unit 41b3 substitutes a larger one of $D_{MAX}$ acquired up to this point and D for $D_{MAX}$ held in the $D_{MAX}$ holding unit 41b9 ($D_{MAX}$=max($D_{MAX}$,D)). The determining unit 41b3 further outputs a count-up signal so as to cause the counter 41b8 to increment cnt by +1 (cnt=cnt+1). After that, the processing advances to step S64.

(S58) The integrating unit 41b6 substitutes D for Dsum held in the integrated value holding unit 41b7 (Dsum=D). The determining unit 41b3 further substitutes D for $D_{MAX}$ held in the $D_{MAX}$ holding unit 41b9 ($D_{MAX}$=D). The determining unit 41b3 further causes the counter 41b8 to set 0 for cnt (cnt=0).

(S59) The determining unit 41b3 sets 1 for fa. After that, the processing advances to step S64.

(S60) The determining unit 41b3 determines whether fa held in the flag value holding unit 41b5 is 1 or not. If fa is 1, the processing advances to step S61, and, if fa is not 1, the processing advances to step S64.

(S61) The determining unit 41b3 determines whether Dsum is higher than Dsump or not. If Dsum is higher than Dsump, the processing advances to step S62, and, if Dsum is equal to or lower than Dsump, the processing advances to step S63.

(S62) The determining unit 41b3 substitutes Dsum for Dsump indicating a maximum value of the integrated values held in the integrated value holding unit 41b7 (Dsump=Dsum). The determining unit 41b3 further updates $D_{MAXp}$ held in the DN holding unit 41b9 with DM ($D_{MAXp}$=$D_{MAX}$) and updates cntp held in the counter value holding unit 41b10 with cnt (cntp=cnt).

Because the processing in the subsequent steps S63 to S65 is the same as the processing in steps S42 to S44 in FIG. 10, the description is omitted.

(S66) The Tmax[k] computation executing unit 41c1 in the Tmax calculating unit 41c calculates Tmax[k]=$D_{MAXp}$/-log($A^{(1/cntp)}$). Thus, the calculation of Tmax[k] ends.

In the processing as described above, cntp corresponds to the number of continuous increases of energy until the state climbs up the energy mountain.

Figure 16:
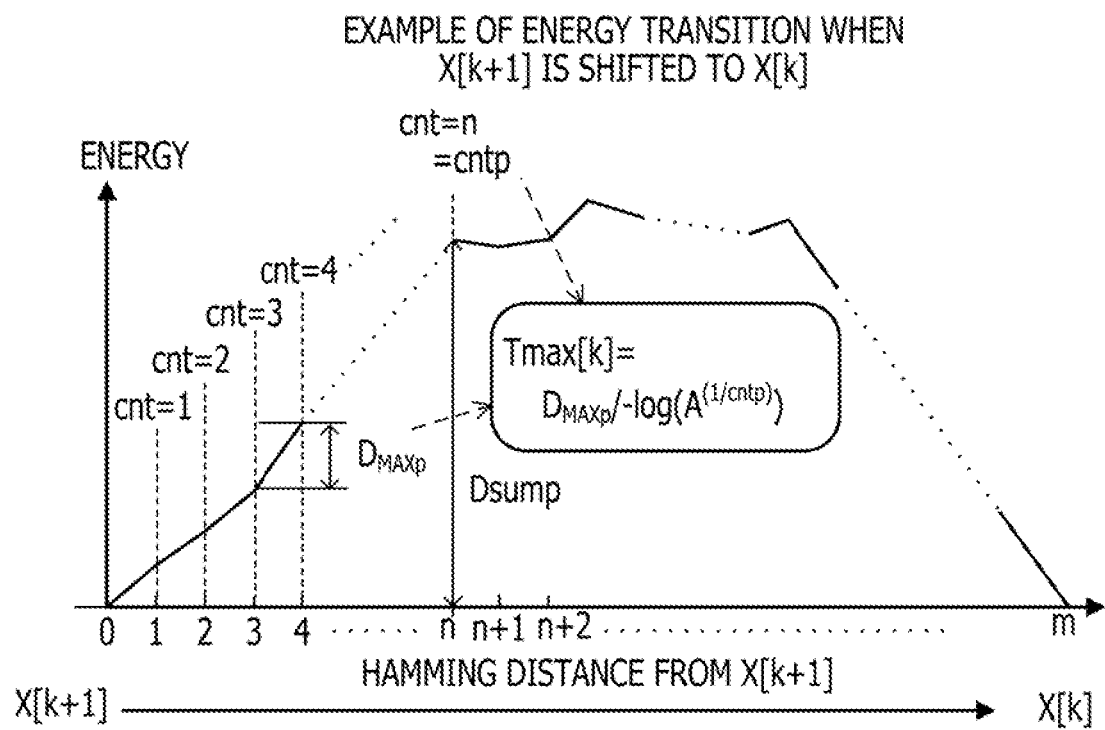
FIG. 16 is a diagram illustrating an example of a relationship between cntp and a mountain of energy.

FIG. 16 is a diagram illustrating an example of a relationship between cntp and an energy mountain. An example of an energy transition when the state is shifted from a local solution (X[k+1]) to another local solution (X[k]) is illustrated. FIG. 16 has a horizontal axis indicating a hamming distance from X[k+1] and a vertical axis indicating energy.

The counter value (cnt) of the counter 41b8 is counted up every time energy increases are continuous. In the example in FIG. 16, when cnt=n, the state climbs up the energy mountain. Dsum that is an integrated value of energy changes at that time is a maximum integrated value Dsump in the case of the example in FIG. 16. Therefore, cnt=n=cntp. A maximum value of energy increases during cnt=1 to n is $D_{MAXp}$, and Tmax[k] is computed based on cntp and $D_{MAXp}$.

By computing Tmax[k] by the expression as described above, A is corrected based on the value of cntp, and an acceptance probability for a state transition causing the energy change with $D_{MAX}$ may be acquired. As the value of cntp increases, the acceptance probability for climbing up the energy mountain increases. Thus, Tmax corresponding to the energy mountain is output from the Tmax calculating unit 41c.

In other words, for example, even in a case where there is a large energy mountain that may not be crossed without many continuous energy increases between X[k] and X[k+1], the mountain may be crossed at a relatively high probability. Thus, even for a problem (such as a spin-glass problem) having a large energy mountain as described above between two local solutions, Tmax adapted to the problem may be set. Therefore, the possibility for acquiring a solution may be increased.

(Hardware Example of Computer)

Each of the optimization apparatuses 10, 20 and 40 of the first to third embodiments may be implemented by software processing resulting from execution of a program by a processor, as described above. In this case, the optimization apparatuses 10, 20 and 40 or a part thereof (such as the temperature setting units 22 and 41 and the overall control unit 23) may be a computer having hardware as described below.

Figure 17:
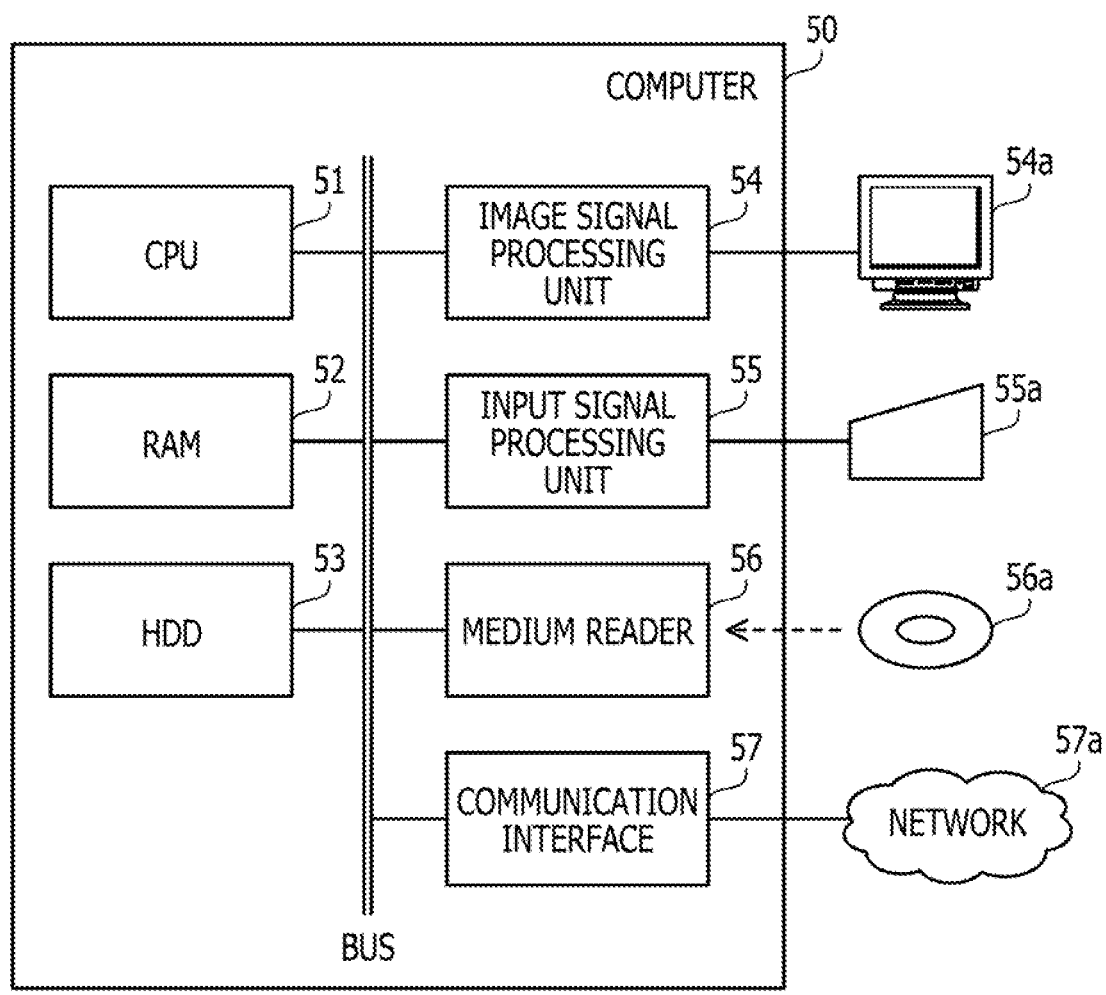
FIG. 17 is a diagram illustrating an example of hardware of a computer.

FIG. 17 is a diagram illustrating an example of hardware of the computer.

A computer 50 includes a CPU 51, a random-access memory (RAM) 52, a hard disk drive (HDD) 53, an image signal processing unit 54, an input signal processing unit 55, a medium reader 56, and a communication interface 57. The above-described units are coupled to a bus.

The CPU 51 is a processor including an arithmetic circuit that executes program instructions. The CPU 51 loads at least part of a program and data stored in the HMD 53 into the RAM 52 and executes the program. The CPU 51 may include a plurality of processor cores, the computer 50 may include a plurality of processors, and the above-described processes may be executed in parallel using a plurality of processors or processor cores. A set of the plurality of processors (multiprocessor) may be referred to as a "processor".

The RAM 52 is a volatile semiconductor memory that temporarily stores a program executed by the CPU 51 and data used for computation by the CPU 51. The computer 50 may include a type of memory other than the RAM and may include a plurality of memories.

The HDD 53 is a non-volatile storage device that stores software programs such as an operating system (OS), middleware and application software, and data. The programs include, for example, a temperature setting program for executing the processing by the above-described temperature setting units 22 and 41. The computer 50 may include other types of storage devices such as a flash memory and a solid-state drive (SSD) and may include a plurality of non-volatile storage devices.

The image signal processing unit 54 outputs an image to a display 54a coupled to the computer 50 in accordance with an instruction from the CPU 51. The display 54a may be a cathode ray tube (CRT) display, a liquid crystal display (LCD), a plasma display panel (PDP), an organic electro-luminescence (OEL) display or the like.

The input signal processing unit 55 obtains an input signal from an input device 55a coupled to the computer 50 and outputs the input signal to the CPU 51. As the input device 55a, a pointing device such as a mouse, a touch panel or a trackball, a keyboard, a remote controller, a button switch and the like may be used. A plurality of types of input devices may be coupled to the computer 50.

The medium reader 56 is a reading device that reads a program or data recorded on a recording medium 56a. As the recording medium 56a, for example, a magnetic disk, an optical disk, a magneto-optical disk (MO), a semiconductor memory and the like may be used. The magnetic disk includes a flexible disk (FD) and an HDD. The optical disk includes a compact disc (CD) and a digital versatile disc (DVD).

For example, the medium reader 56 copies a program or data read from the recording medium 56a to another recording medium such as the RAM 52 or the HDD 53. The read program is executed by the CPU 51, for example. The recording medium 56a may be a portable recording medium or may be used to distribute the program or data. The recording medium 56a and the HDD 53 may be referred to as computer-readable recording media.

The communication interface 57 is an interface which is coupled to a network 57a and communicates with another information processing apparatus via the network 57a. The communication interface 57 may be a wired communication interface coupled to a communication device such as a switch via a cable or may be a wireless communication interface coupled to a base station via a wireless link.

The processing details by the above-described optimization apparatuses 10, 20 and 40 may be realized by causing the computer 50 as described above to execute a program.

The program may be recorded on a computer-readable recording medium (such as the recording medium 56a). As the recording medium, for example, a magnetic disk, an optical disk, a magneto-optical disk, a semiconductor memory, and the like may be used. The magnetic disk includes an FD and an HDD. The optical disk includes a CD, a CD-recordable (R)/rewritable (RW), a DVD, and a DVD-R/RW. The program may be recorded and distributed on a portable recording medium. In that case, the program may be copied from the portable recording medium to another recording medium (such as the HDD 53) and executed.

As described above, although one aspect of an optimization apparatus, a temperature setting method for the optimization apparatus and a temperature setting program for the optimization apparatus according to the present invention has been described based on the embodiments, such an aspect is a mere example and is not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization apparatus comprising:
   a memory; and
   a processor coupled to the memory and configured to:
   execute search for a ground state of energy in an Ising model by using a plurality of temperature values,
   select a first solution and a second solution from a plurality of solutions,
   sequentially perform processing of calculating a change of the energy in the Ising model caused when one value of a plurality of bits of a bit sequence of the first solution different from bits of a bit sequence of the second solution is changed on each of the plurality of bits,
   computing, when an increase of the energy continuously occurs a plurality of number of times, a total value of the energies increased in the plurality of number of times during the process of calculating the change of the energy,
   decide a maximum value of the plurality of temperature values based on the total value, and setting the decided maximum value, of the Ising model that is adapted to the change of the energy.

2. The optimization apparatus according to claim 1, wherein the processor decides the maximum value based on a value acquired by dividing the total value by a logarithm of a predetermined probability value.

3. The optimization apparatus according to claim 1, wherein
the processor is further configured to:
count the number of times of occurrence of continuous increases of the energy,
hold a count value of the number of times when the total value for the first solution and the second solution is maximum and a maximum increase value of increases of the energy continuously occurring a plurality of number of times, and
decide the maximum value based on a value acquired by dividing the maximum increase value by a logarithm having a predetermined probability as a base and a reciprocal of the count value as an exponent.

4. The optimization apparatus according to claim 1, wherein
the processor calculates a candidate value for the maximum value with respect to a plurality of solution pairs selected from the plurality of solutions including three or more solutions, wherein
the maximum value to be set for the searching unit is a maximum value among candidate values computed for each of the plurality of solution pairs.

5. A temperature setting method comprising:
executing search for a ground state of energy in an Ising model by using a plurality of temperature values; and
selecting a first solution and a second solution from a plurality of solutions;
sequentially performing processing of calculating a change of the energy in the Ising model caused when one value of a plurality of bits of a bit sequence of the first solution different from bits of a bit sequence of the second solution is changed on each of the plurality of bits;
computing, when an increase of the energy continuously occurs a plurality of number of times, a total value of the energies increased in the plurality of number of times during the process of calculating the change of the energy;
deciding a maximum value of the plurality of temperature values based on the total value; and
setting the decided maximum value, of the Ising model that is adapted to the change of the energy.

6. The temperature setting method according to claim 5, the method further comprising:
deciding the maximum value based on a value acquired by dividing the total value by a logarithm of a predetermined probability value.

7. The temperature setting method according to claim 5, the method further comprising:
counting the number of times of occurrence of continuous increases of the energy;
holding a count value of the number of times when the total value for the first solution and the second solution is maximum and a maximum increase value of increases of the energy continuously occurring a plurality of number of times; and
deciding the maximum value based on a value acquired by dividing the maximum increase value by a logarithm having a predetermined probability as a base and a reciprocal of the count value as an exponent.

8. The temperature setting method according to claim 5, the method further comprising:
calculating a candidate value for the maximum value with respect to a plurality of solution pairs selected from the plurality of solutions including three or more solutions, wherein
the maximum value is a maximum value among candidate values computed for each of the plurality of solution pairs.

9. A non-transitory computer-readable storage medium storing a program that causes a processor included in an optimization apparatus to execute a process, the process comprising:
executing search for a ground state of energy in an Ising model by using a plurality of temperature values; and
selecting a first solution and a second solution from a plurality of solutions;
sequentially performing processing of calculating a change of the energy in the Ising model caused when one value of a plurality of bits of a bit sequence of the first solution different from bits of a bit sequence of the second solution is changed on each of the plurality of bits;
computing, when an increase of the energy continuously occurs a plurality of number of times, a total value of the energies increased in the plurality of number of times during the process of calculating the change of the energy;
deciding a maximum value of the plurality of temperature values based on the total value; and
setting the decided maximum value, of the Ising model that is adapted to the change of the energy.

10. The non-transitory computer-readable storage medium according to claim 9, wherein the deciding includes deciding the maximum value based on a value acquired by dividing the total value by a logarithm of a predetermined probability value.

11. The non-transitory computer-readable storage medium according to claim 9, wherein the process further includes:
counting the number of times of occurrence of continuous increases of the energy; and
holding a count value of the number of times when the total value for the first solution and the second solution is maximum and a maximum increase value of increases of the energy continuously occurring a plurality of number of times; wherein
the deciding includes deciding the maximum value based on a value acquired by dividing the maximum increase value by a logarithm having a predetermined probability as a base and a reciprocal of the count value as an exponent.

12. The non-transitory computer-readable storage medium according to claim 9, wherein the process further includes:
calculating a candidate value for the maximum value with respect to a plurality of solution pairs selected from the plurality of solutions including three or more solutions, wherein
the maximum value is a maximum value among candidate values computed for each of the plurality of solution pairs.

* * * * *